(12) United States Patent
Chakraborty et al.

(10) Patent No.: US 11,327,476 B2
(45) Date of Patent: May 10, 2022

(54) SENSOR FALL CURVE IDENTIFICATION

(71) Applicant: Microsoft Technology Licensing, LLC, Redmond, WA (US)

(72) Inventors: Tusher Chakraborty, Dacca (BD); Akshay Uttama Nambi Srirangam Narashiman, Bangalore (IN); Ranveer Chandra, Kirkland, WA (US); Rahul Anand Sharma, Alwar (IN); Manohar Swaminathan, Bangalore (IN); Zerina Kapetanovic, Tukwila, WA (US); Jonathan Appavoo, Brookline, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 593 days.

(21) Appl. No.: 16/189,736

(22) Filed: Nov. 13, 2018

(65) Prior Publication Data

US 2020/0150640 A1 May 14, 2020

(51) Int. Cl.
*G05B 23/02* (2006.01)
*G01D 18/00* (2006.01)
*G01N 27/22* (2006.01)

(52) U.S. Cl.
CPC ......... *G05B 23/0232* (2013.01); *G01D 18/00* (2013.01); *G05B 23/0237* (2013.01); *G01N 27/223* (2013.01)

(58) Field of Classification Search
CPC ............ G05B 23/0232; G05B 23/0237; G01D 18/00; A01G 25/167; G01N 27/223; G01R 31/2829; G06F 21/577; G06F 21/44
See application file for complete search history.

(56) References Cited

U.S. PATENT DOCUMENTS

| | | | | |
|---|---|---|---|---|
| 5,754,963 A | * | 5/1998 | Nunneley | G01D 3/08 324/537 |
| 6,489,798 B1 | * | 12/2002 | Scott-Thomas | H04N 5/374 324/762.01 |
| 2011/0050620 A1 | | 3/2011 | Hristov | |
| 2016/0203036 A1 | * | 7/2016 | Mezic | G06F 11/079 714/819 |
| 2018/0120132 A1 | * | 5/2018 | Tanutama | G01D 21/00 |

OTHER PUBLICATIONS

Chakraborty, et al., "Fall-Curve: A Novel Primitive for IoT Fault Detection and Isolation", In Proceedings of the 16th ACM Conference on Embedded Networked Sensor Systems, Nov. 4, 2018, pp. 95-107.
"International Search Report and Written Opinion Issued in PCT Application No. PCT/US19/059940", dated Feb. 14, 2020, 10 Pages.
Zhang, et al., "Distributed online outlier detection in wireless sensor networks using ellipsoidal support vector machine", In Journal of Ad Hoc Networks, vol. 11 Issue 3, May 2013, pp. 1062-1074.

(Continued)

Primary Examiner — Mischita L Henson
(74) Attorney, Agent, or Firm — Schwegman Lundberg & Woessner, P.A.

(57) ABSTRACT

A computer implemented method includes turning off a sensor, receiving fall curve data from the sensor, and comparing the received fall curve data to a set of fall curve signatures to identify the sensor or a sensor fault.

20 Claims, 25 Drawing Sheets

(56) References Cited

OTHER PUBLICATIONS

"Soil Temperature Sensor Probes", Retrieved From https://www.vegetronix.com/Products/THERM200/, Retrieved From Apr. 4, 2018, 6 Pages.
Balzano, et al., "Blind Calibration of Sensor Networks", Proceedings of the 6th International Conference on Information Processing in Sensor Networks, 2007, pp. 79-88.
Bychkovskiy, et al., "A Collaborative Approach to In-Place Sensor Calibration", In Proceedings of the 2nd International Conference on Information Processing in Sensor Networks, Apr. 22-23, 2003, pp. 301-316.
Chatzigiannakis, et al., "Diagnosing Anomalies and identifying faulty nodes in sensor networks", In IEEE Sensors Journal, vol. 7, Issue 5, May 2007, pp. 637-645.
Chen, et al., "A Scalable Software-Based Self-Test Methodology for Programmable Processors", In Proceedings of the 40th Annual Design Automation Conference, Jun. 2-6, 2003, pp. 548-553.
Curiac, et al., "Ensemble based Sensing Anomaly Detection in Wireless Sensor Networks", In Expert Systems with Applications, vol. 39, Issue 10, Aug. 2012, pp. 9087-9096.
Deshpande, "Model-Driven Data Acquisition in Sensor Networks", In Proceedings of the Thirtieth international conference on Very large data bases—vol. 30, Aug. 31-Sep. 3, 2004, pp. 588-599.
"LTspice", Retrieved From https://www.analog.com/en/design-center/design-tools-and-calculators/ltspice-simulator. html, 2018, 2 Pages.
Elnahrawy, et al., "Cleaning and Querying Noisy Sensors", In Proceedings of the 2nd ACM International Conference on Wireless Sensor Networks and Applications., Sep. 19, 2003, pp. 78-87.
Gupta, et al., "ProtoNN: Compressed and Accurate kNN for Resource-scarce Devices", In Proceedings of the 34th International Conference on Machine Learning, Sydney, Australia, Feb. 2017, 16 Pages.
Vegetronix Inc., "VH400 Soil Moisture Sensor Probes", Retrieved From https://www.vegetronix.com/Products/VH400/, Retrieved from Apr. 4, 2018, 8 Pages.
Jeffery, et al., "Declarative Support for Sensor Data Cleaning", In International Conference on Pervasive Computing., May 7-10, 2006, pp. 83-100.
Khoussainova, et al., "Towards Correcting Input Data Errors Probabilistically Using Integrity Constraints", In Proceedings of the 5th ACM international workshop on Data engineering for wireless and mobile access, Jun. 25-25, 2006, pp. 43-50.
Koushanfar, et al., "On-line fault detection of sensor measurements", In Proceedings of IEEE Sensors, vol. 2, Oct. 2003, pp. 974-979.
Krishnamachari, et al., "Distributed Bayesian Algorithms for Fault-tolerant Event Region Detection in Wireless Sensor Networks", In IEEE Transactions on Computers, vol. 53, Issue 3, Mar. 2004, pp. 241-250.
Livani, et al., "Distributed PCA-based anomaly detection in wireless sensor networks", In International Conference for Internet Technology and Secured Transactions, Nov. 8-11, 2010, pp. 1-8.
Mukhopadhyay, et al., "Model Based Error Correction for Wireless Sensor Networks.", In First Annual IEEE Communications Society Conference on Sensor and Ad Hoc Communications and Networks, Oct. 4-7, 2004, pp. 575-584.
Nedelkovski, "DHT11 & DHT22 Sensors Temperature and Humidity Tutorial using Arduino", Retrieved From Apr. 4, 2018, 22 Pages.
Ni, et al., "Bayesian selection of non-faulty sensors", In IEEE International Symposium on Information Theory, Jun. 2007, pp. 616-620.
Ni, et al., "Sensor network data fault types", In ACM Transactions on Sensor Networks,vol. 5 Issue 3, May 2009, 29 Pages.
O'Reilly, et al., "Anomaly Detection in Wireless sensor networks in a non-stationary environment", In IEEE Communications Surveys & Tutorials, vol. 6, Issue 3, Jan. 2014, pp. 1413-1432.
Orwiler, Bob, "Vertical Amplifier Circuits", In Tektronix, Incorporation, Dec. 1969, 1-461 (467 pages.).
Rajasegarar, et al., "Centered hyperspherical and hyperellipsoidal one-class support vector machines for anomaly detection in sensor networks.", In IEEE Transactions on Information Forensics and Security, vol. 5, Issue 3, Sep. 2010, pp. 518-533.
Ramanathan, et al., "Rapid Deployment with Confidence:Calibration and Fault Detection in Environmental Sensor Networks", In Technical Reports, Jul. 4, 2006, 14 Pages.
Ramanathan,, et al., "The final frontier: Embedding networked sensors in the soil", In Technical Reports Center for Embedded Network Sensing, 2006, 10 Pages.
Sharma,, et al., "Sensor faults: Detection methods and prevalence in real-world datasets", In ACM Transactions on Sensor Networks (TOSN), vol. 6, Issue 3, Jun. 2010, 39 Pages.
Sheng, et al., "Outlier detection in sensor networks", In Proceedings of the 8th ACM International Symposium on Mobile ad hoc Networking and Computing, Sep. 9-14, 2007, pp. 219-228.
Sparkfun, "SparkFun Soil Moisture Sensor", Retrieved From https://web.archive.org/web/20181015153729/https://www.sparkfun.com/products/13322, Retrieved on May 27, 2018, 6 Pages.
Subramaniam, et al., "Online Outlier Detection in Sensor Data using Non-Parametric Models.", In Proceedings of the 32nd international conference on Very large data bases, Sep. 12-15, 2006, 187-198.
Tolle, et al., "A macroscope in the redwoods.", In Proceedings of the 3rd international conference on Embedded networked sensor systems, Nov. 2-4, 2005, pp. 51-63.
Tulone, et al., "PAQ: Time Series Forecasting For Approximate Query Answering in Sensor Networks", In European Workshop on Wireless Sensor Networks., Feb. 13-15, 2006, 17 Pages.
Xie, "Scalable hypergrid k-NN-based online anomaly detection in wireless sensor networks", IEEE Transactions on Parallel and Distributed Systems, vol. 24 Issue 8, Aug. 2013, pp. 1661-1670.
Dfrobot, "Gravity: Analog Capacitive Soil Moisture Sensor—Corrosion Resistant", Retrieved From: https://goo.gl/p5bhFK, 2012, 9 Pages.

* cited by examiner

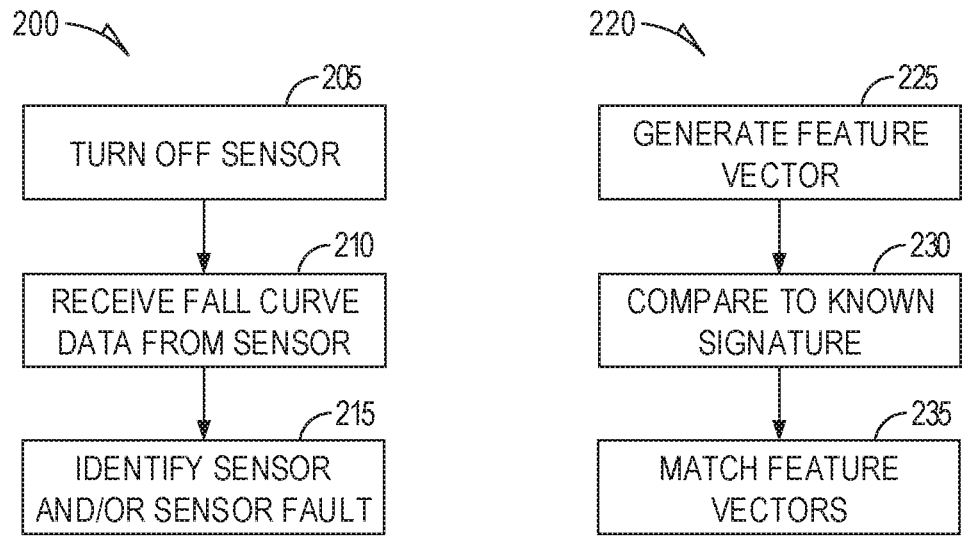
FIG. 2A
FIG. 2B
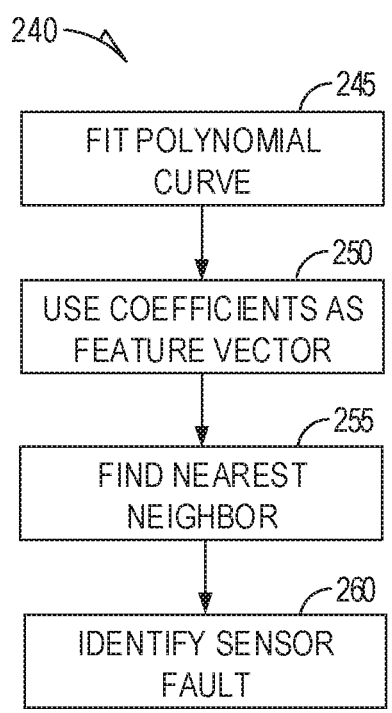
FIG. 2C

SENSOR FALL CURVE IDENTIFICATION

BACKGROUND

Internet of Things (IoT) systems gather data from various sensors. The gathered data is processed to provide unique insights from the IoT deployment. These sensors are often battery powered, rely on low-cost components, and might be deployed in harsh environments. Given the likelihood of sensor failures, a key challenge in the design of IoT systems is ensuring the integrity, accuracy, and fidelity of data reported by the sensors.

To identify sensor failures, existing schemes typically use a data centric, rule-based approach. These schemes detect anomalies in the reported sensor data for fault detection. However, such an approach has inherent limitations. First, faulty sensor data can mimic non-faulty data. For example, sensor data obtained when an "open" ADC/ground connection of a sensor mimics non-faulty sensor data.

Second, an anomalous sensor reading is often not enough to identify the root cause of the sensor failure. For example, an incorrect reading could be caused by a bad sensor, low battery, or an error with the microprocessor, among other factors. The capability to isolate the faulty component is especially important for IoT deployments where the field staff might have limited technical background, and it might be expensive for staff with deep technical expertise to reach remote areas, for example, in oil and gas, agriculture, mining, forestry, and other verticals.

SUMMARY

A computer implemented method includes turning off a sensor, receiving fall curve data from the sensor, and comparing the received fall curve data to a set of fall curve signatures to identify the sensor or a sensor fault.

BRIEF DESCRIPTION OF THE DRAWINGS

FIGS. 2A, 2B, 2C, and 2D are flowcharts illustrating computer implemented methods of identifying devices and/or device faults based on a Fall-curves according to an example embodiment.

DETAILED DESCRIPTION

Figure 1:
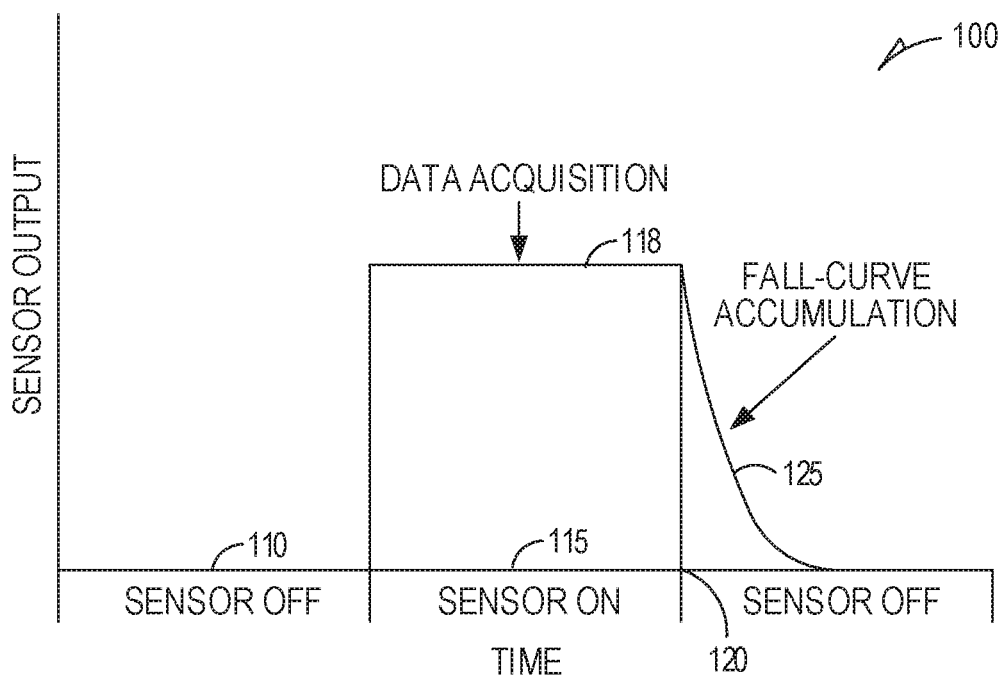
FIG. 1 is a diagram illustrating sensor voltage including Fall-curve voltage according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware-based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

When a sensor is powered off it continues to output analog signal for a short period of time, primarily due to parasitic capacitance of the sensor board. These values decay in a characteristic "Fall-curve". A sensor's Fall-curve constitutes a unique signature and is agnostic to the phenomena being monitored. A Fall-curve based technique is used to identify the sensor connected to an IoT device and determine whether the sensor is correctly operating.

In a typical operation, the Fall-curves are sampled either periodically by Fall-curve circuitry, or on-demand in response to anomalous data. If there is a suspected error in the reported readings, Fall-curve is used to identify the likely cause of the error. The use of Fall-curves, including the algorithms to match Fall-curves implemented by the Fall-curve circuitry, consume extremely low-power, and can be run locally on the IoT device itself with less than 0.3% energy overhead. The approach may be used in a system that includes variety of analog and digital sensors.

The Fall-curve provides a way to identify faults by shutting the power off to the sensor, and thus it is independent of the sensing environment. Hence, Fall-curves may be used to identify faulty sensors, even when the reported readings are similar to real-world data. Finally, the Fall-curve based technique is able to isolate the cause of the fault without requiring additional hardware, or spatiotemporal correlation across multiple physical sensors. It also works across a range of sensors and IoT environments.

The Fall-curve may be used to characterize a sensor. Fall-curves can identify faulty sensors, including both analog and digital sensors, over a wide variety of sensors.

In various embodiments, a Fall-curve of a sensor having been just turned off is measured and analyzed to determine if a failure mode in the sensor has altered the fall curve from the fall curve of a normal sensor. The fall curve for different types of failures may be different, allowing identification of a failure that has occurred. A report detailing the failure type and identifying the sensor may be sent by the sensor.

The Fall-curve may also be used auto-detect the signature of known sensors. Multiple sensors of a known type of sensor from a manufacturer may very similar if not identical Fall-curves. The same type of sensor from a different manufacturer may have a different Fall-curve. Different types of sensors likely have different Fall-curves. By correlating known fall curves of sensors to measured fall curves, the type of sensor and possibly the manufacturer of the sensor may be detected.

The Fall-curve circuitry may adjust algorithms and sampling to accommodate different sensors having different battery power and processing power availability. The adjustments, as well as the ability to identify sensor types allows for swapping out sensors without altering code.

An example IoT device may include a number of components such as (i) microcontrollers, (ii) sensors, (iii) analog-to-digital converter (ADC), (iv) connectivity module, and (v) batteries. Typical sensor data faults include shorts, spikes, stuck-at, noise, and calibration. Shorts may be caused by battery fluctuation, transient sensor malfunction, loose wires, and other causes. Spikes are a rate of change that is much greater than expected, and may be caused by low battery, analog to digital conversion failure, short-circuit, loose wire connection, control unit faults and others. A stuck-at fault may manifest as a series of data points having little if any variation for a period of time longer than expected. Stuck-at faults may be caused by ADC failure, trigger failure, control unit fault, short-circuit, open connection, clipping, sensor malfunction, etc. Noise may be caused by battery fluctuation, open connection, trigger failure, sensor malfunction, and others. Calibration faults may result from sensor drift, ADC drift, battery offset, control unit fault, sensor malfunction, etc.

While the above causes do occur, sensor failures are often the most common causes of sensor data faults in IoT deployments. Sensor failures can be transient or permanent due to malfunction of sensor hardware circuity, physical damage to the sensor, exposure to the harsh environment, etc. Detecting sensor data faults is challenging using a data-centric approach. Consider a sensor deployment in an agricultural farm to monitor the soil moisture value at different soil depths without having any prior data. In this case, the spatial correlation of sensor data is not effective given the heterogeneous nature of the field. Further, temporal correlation requires irrigation timing information and rainfall detection, which are loosely correlated across the field due to the diversity in moisture sensing depth, soil texture, and composition. Thus, it is impossible to model sensor data without significant domain and contextual information.

Faulty sensor data may mimic non-faulty sensor data in real-world deployments. In one example failure, an open ADC was acting as an antenna which was picking a signal from printed circuit board traces and generating values which mimic real sensor data. A similar fault can also be observed in case of an open ground connection. Hence, it is crucial to accurately monitor the condition of the sensor.

In another example, a light sensor deployed in a room exhibits periods where light values are significantly high. These regions correspond to the abrupt changes in room-lighting. While traditional data-centric models might raise a false alarm, the data was actually valid. Hence, fault detection techniques need to be robust to isolate accurate data from faulty data.

FIG. 1 is a graph 100 illustrating operation of a device, such as a sensor. Sensor output is indicated on the y-axis with time indicated on the x-axis. During a time period 110, the sensor is off. During time period 115, the sensor is on, and data 118 is being acquired from the sensor. At time 120, the sensor is turned off. Power to the sensor is discontinued. The sensor output decays in what is known as a Fall-curve 125.

It is common practice in IoT systems to power on sensors only for the period of data collection in order to save energy. Typically, when the sensor is turned off the output signal takes a certain amount of time before going down to zero, referred to as a (the time during which the output falls to or near zero) which is shown as Fall-curve 125. This Fall-time is primarily due to parasitic capacitance in a sensor circuit that exists between the parts of an electronic component or printed circuit board (PCB) traces because of their proximity to each other.

During the powered ON state, time period 115, of the sensor, these parasitic capacitors charge and when the power is turned off at 120, the parasitic capacitors start discharging over the circuit of the sensor. Consequently, the sensor's voltage response when the power is turned off goes down to zero following a curve, which is defined as the "Fall-curve" 125. The characteristic of the Fall-curve 125 also depend on the electronic components and circuitry of a sensor. The Fall-curve 125 may be sampled via an analog to digital converter (ADC) for a short period of time after turning off the sensor.

FIG. 2A is a flowchart illustrating a computer implemented method 200 of using Fall-curves to identify devices, such as sensors, or to identify a fault in a device. At operation 205, the sensor is turned off. The output of the sensor following turning off of the sensor is sampled to generate fall curve data. The fall curve data from the sensor is received at 210. The fall curve data is compared at operation 215 to a set of known fall curve signatures to identify the sensor or to identify a sensor fault. Both may be identified in some embodiments.

The fall curve data corresponds to an analog signal output from the sensor in response to turning off the sensor and comprises a time series sampling of the analog signal. The analog signal may be sampled periodically or in response to anomalous data received from the sensor prior to turning off the sensor. The set of fall curve signatures may include fall curve signatures from properly operating sensors that are different for different types of sensors and fall curve signatures from faulty sensors that are different for different types of faults.

The set of fall curve signatures may include fall curve signatures from sensors having one or more of the faults comprising short fault, spike fault, stuck-at fault. The faults may be induced in the sensors prior to measuring the fall curves.

Comparing the received fall curve data to a set of fall curve signatures at operation 215 to identify the sensor or a sensor fault at operation is performed via cloud based computing resources in one embodiment, by network edge based resources, by the sensor comprising a digital sensor, or a combination thereof.

FIG. 2B is a flowchart illustrating a computer implemented method 220 of comparing the received fall curve data. The curve data comprises a time series sampled analog output from the sensor in response to turning off the sensor. Method 220 includes generating a feature vector for the time series sampled analog output at operation 225. At operation 230, The feature vector is compared to feature vectors corresponding to the set of fall curve signatures to match the generated feature vector with one of the feature vectors of the set of fall curve signatures.

FIG. 2C is a flowchart illustrating a computer implemented method 240 of generating a feature vector. At operation 245, a polynomial curve is fit to the time series sampled analog output of the sensor. Polynomial coefficients of the polynomial curve are used at operation 250 as the feature vector. A nearest neighbor to the polynomial coefficients is found at operation 255. The sensor and/or sensor fault is identified at operation 260 in response to the nearest neighbor being within a certain threshold. In one embodiment, hyper-parameters comprising fall curve width and polynomial degree are tuned to trade off accuracy based on resource and power constraints. While the sensor referenced with respect to the computer implemented methods is described as an IoT sensor, the sensor may also be any other type of device, whether wireless or hardwired that has a Fall-curve that may be used to distinguish it from other devices or that is indicative of device faults.

Figure 2D:
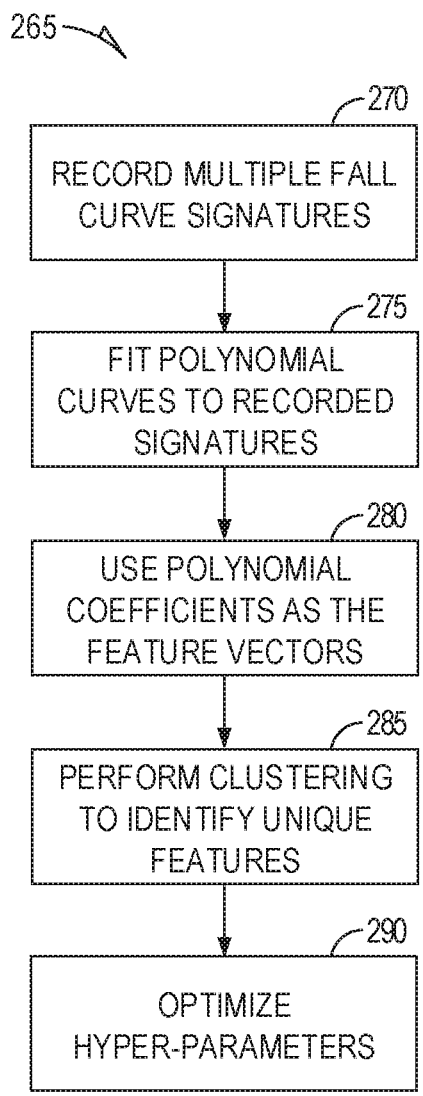

FIG. 2D is a flowchart illustrating a computer implemented method 265 of generating feature vectors corresponding to the set of fall curve signatures. At operation 270, multiple fall curve signatures for multiple sensors and an ID for each of the multiple sensors are recorded by sampling the output of the sensors as they are turned off. Polynomial curves are fitted at operation 275 to the recorded signatures. The polynomial coefficients of the polynomial curve are used as the feature vector at operation 280. Clustering is performed at operation 285 on the feature vectors for each sensor to identify a smaller set of unique features for each sensor. Such a smaller set can be used to reduce processing time in identifying sensors and/or corresponding sensor faults. Reduction in processing time can save battery energy for wireless sensors that include controllers performing the methods.

In one embodiment, method 265 includes optimizing a set of hyper-parameters at operation 290. The hyper-parameters may include one or more of fall curve width, degree of polynomial, and number of clusters. Operation 290 is performed to reduce power and resources for comparing the received fall curve data to the set of fall curve signatures.

Figure 3A:
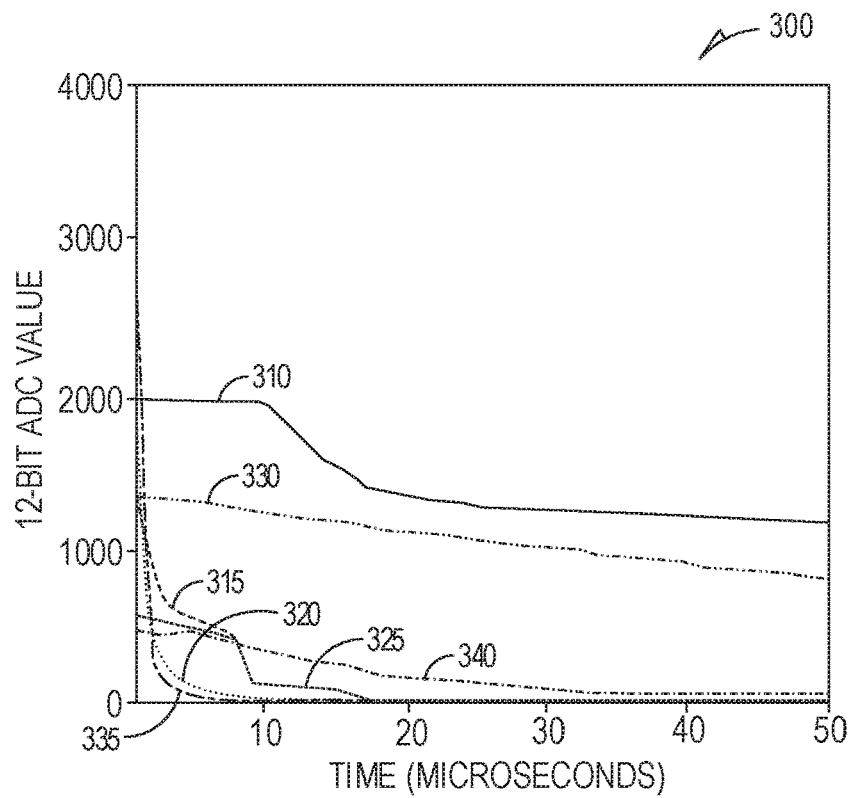
FIGS. 3A, 3B, and 3C illustrate Fall-curve characteristics across various sensors according to an example embodiment.
Figure 3B:
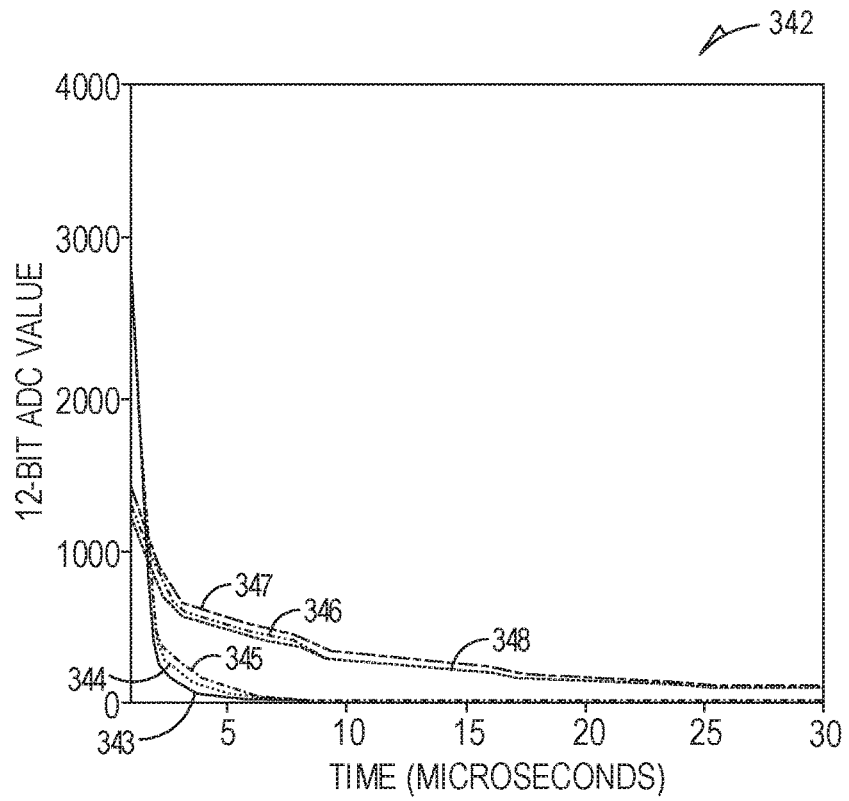
Figure 3C:
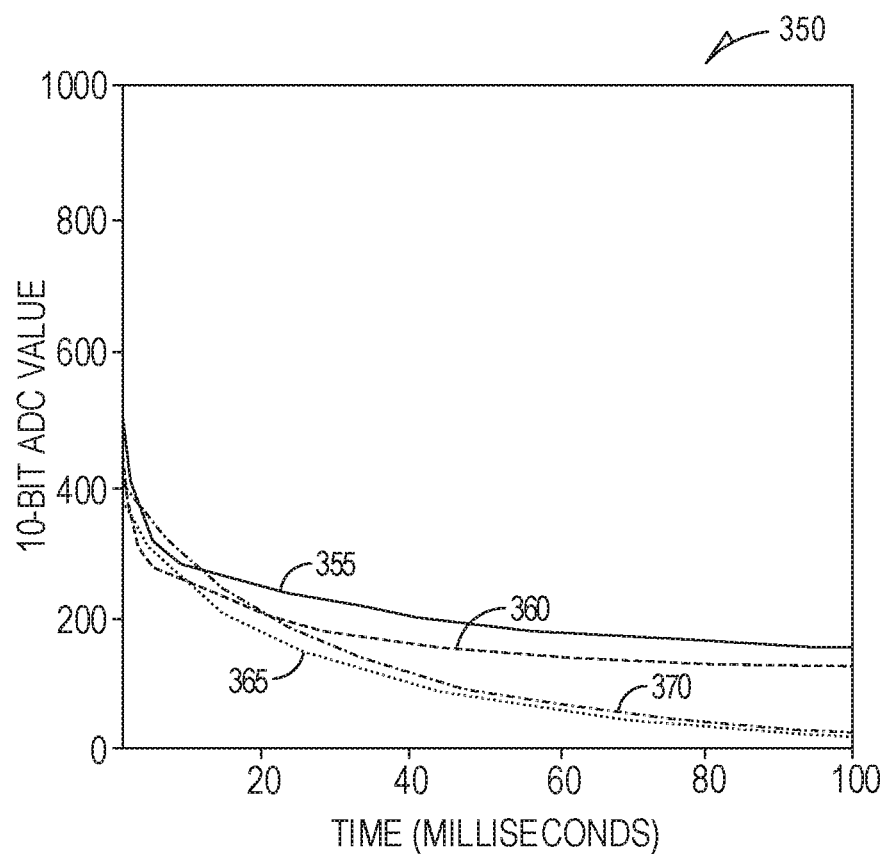

To study the characteristics of Fall-curve across different sensors, several testbed experiments with over 20 different sensor types were conducted. These sensors are commonly used in diversified IoT applications, such as agriculture, robotics, air quality monitoring, smart home, etc. The set of sensors includes soil moisture (from different manufacturers), soil temperature, ambient temperature, accelerometer, current sensor, ambient light sensor (MR), different gas sensors (MQ series), obstacle detector, heart rate sensor, sound sensor, vibration sensor, hall effect sensor, line tracker sensor, etc. Here, to accumulate a Fall-curve through ADC, we used two different microcontroller-based development boards: ATmega328P based Arduino Uno and ARM Cortex M4 based Tiva TM4C123G. FIGS. 3A, 3B, and 3C show the experimental results and depicts the characteristics of the Fall-curve for various sensors.

FIG. 3A shows Fall-curves generally at 300 for seven non-faulty sensors. The corresponding curves include accelerometer 310, current sensor 315, Hall sensor 320, LDR sensor 325, line tracker 330, soil moister 335, and sound sensor 340. The x-axis indicates the time in microseconds and the y-axis shows the sensor value obtained from a 12-bit ADC. Each sensor has its own unique Fall-curve due to the varying parasitic capacitance and circuitry in the sensor. Thus, each sensor has a unique Fall-curve signature that can be leveraged to identify the sensor attached to the microcontroller.

FIG. 3B shows Fall-curves in graph 342 accumulated only after the sensor is turned off independent of an environment in which a sensor may be placed. The Fall-curve data collected should be agnostic to the phenomena being monitored. The Fall-curve of a sensor at different sensor values is evaluated. For example, accumulated Fall-curves of a soil moisture sensor are accumulated when it was measuring moisture content at 80%, 65%, and 55%, as shown by curves 343, 344, and 345 respectively. FIG. 3B shows the Fall-curves of a soil moisture sensor for different soil moisture values. The Fall-curves of the same soil moisture sensor has similar characteristics, even though, the measured moisture contents were different in each iteration (Itr). FIG. 3B also shows Fall-curves of a current sensor with different measured current values at 346, 347, and 348.

The circuitry associated with a sensor type varies from one manufacturer to another. This variation is due to the use of different resistor/capacitor values, dissimilar component models (part numbers), circuitry manufacturing variations, etc. Consequently, leading to a varying parasitic capacitance of a sensor circuit. Thus, the Fall-curves of the same sensor from different manufacturers are distinguishable. To evaluate this, an experiment involving two soil moisture sensors from each of two different manufacturers was conducted. FIG. 3C at 350 shows the Fall-curves 355, 360, 365, and 370 for various soil moisture sensors, where respective sensors SM1, SM2 are from Manufacturer 1 (M1) and SM3, SM4 are from Manufacturer 2 (M2). It can be seen that Fall-curves of SM1/SM2 355, 360 from M1 has a distinguishable characteristic compared to SM3/SM4 365, 370 from M2. Thus, the same sensor from different manufacturers has a distinct Fall-curve. Furthermore, two sensors from the same manufacturer have similar Fall-curves (as seen in FIG. 3C where Fall-curves of SM1 355 and SM2 360 resemble each other).

A simulator may be used to characterize the sensor behavior. Sensor circuitry is derived using the sensor's datasheet (from the manufacturer) to determine the parasitic components. The circuitry was fed into a SPICE simulator to study the Fall-curve characteristics.

Figure 4A:
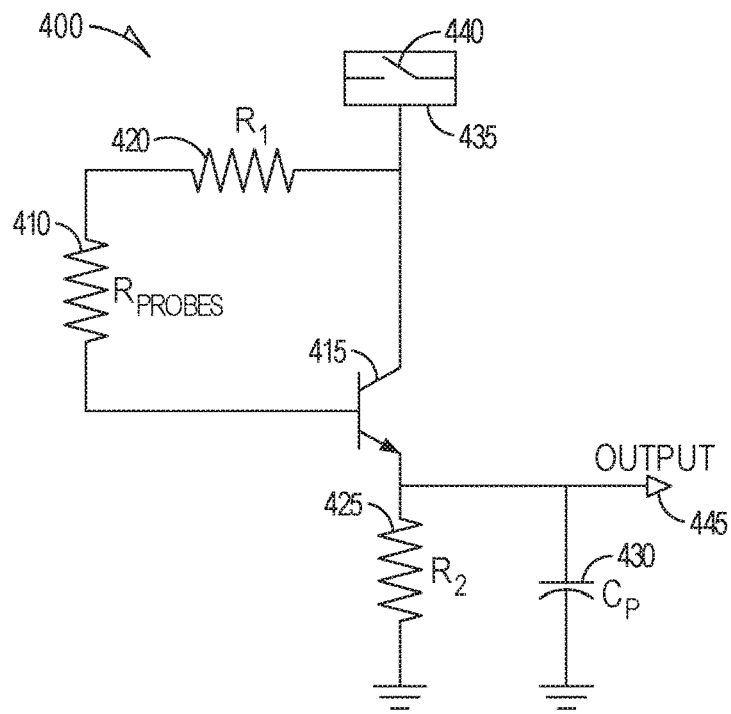
FIG. 4A is a schematic diagram of a soil moister sensor according to an example embodiment.

The sensor in one example is a resistive soil moisture sensor, viz., SEN13322. FIG. 4A is a circuit diagram the sensor (from its datasheet) that consists of a transistor (2N3904) 415, two resistors (R1 420, R2 425), and two resistive probes represented as a single resistance across their outputs (Rprobes 410). Given there exists no capacitance in the sensor circuitry, the Fall-curve is expected to drop down immediately to zero. This can be represented by deriving the equation for the output voltage of the sensor. The base current (IB) and emitter current (IE) of the transistor are, $$I_B = \frac{V_{cc} - 0.6}{(R_1 + R_{probes}) + (1 + \beta) * R_1}$$

and $I_B*(\beta+1)$ where $\beta$ is the transistors current gain and $V_{cc}$ is the input voltage.

Using these two equations, the equation for the output voltage, $$V_{out} = R_2 * \left( \frac{(V_{cc} - 0.6) * (1 + \beta)}{(R_1 + R_{probes}) + (1 + \beta) * R_1} \right) \quad (1)$$

The soil moisture sensor can experience a variety of changes, for example, the resistance of $R_{probe}$ 410 changing due to the moisture content of the soil. Hence, to analyze this circuit extensively a SPICE simulator is used. To ensure an accurate simulation, the same component values are used that are on the physical circuit, where $R_1=100\Omega$, $R_2=10$ k$\Omega$, and a 2N3904 Bi-Polar NPN transistor are used. To set $R_{probes}$, the resistance across the resistive probes is measured when under wet conditions, which came out to be approximately 1500 k$\Omega$. The voltage supply 435 was set to be a square wave at 5V.

Figure 4B:
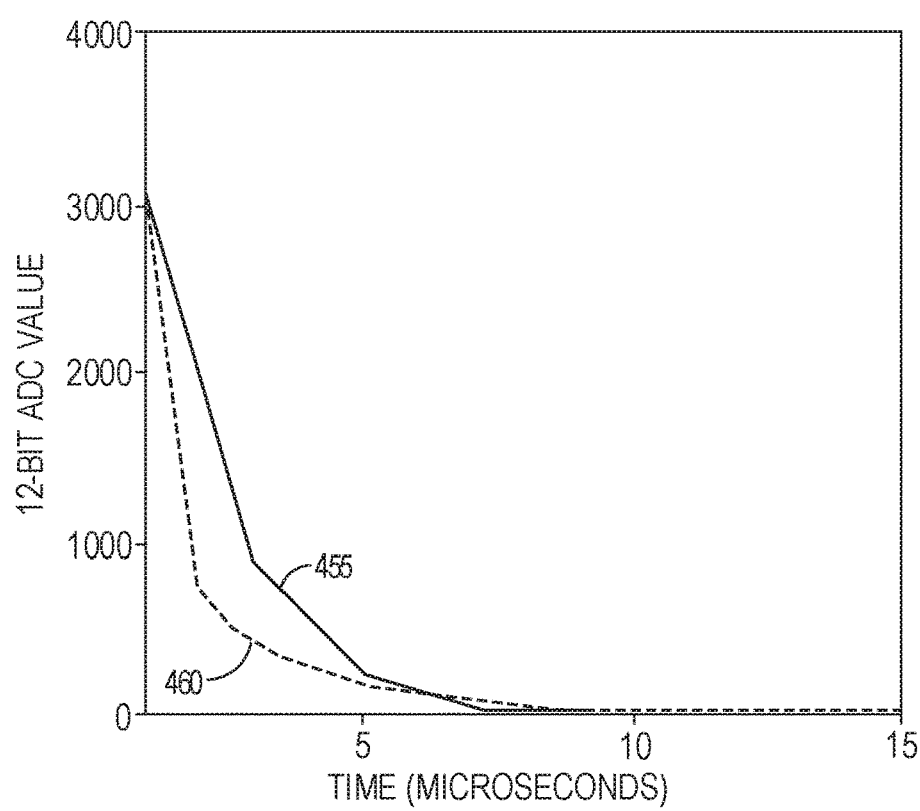
FIG. 4B is a graph showing Fall-curve comparisons according to an example embodiment.

The Fall-curve in the simulation drops immediately down to zero, as expected. However, the experimental results utilizing switch 440 to remove the supply voltage 435 showed a delay in the Fall-curve, implying that a small amount of capacitance 430 is present at the output terminal of the sensor. In order to justify the experimental result for the Fall-curve, the parasitic capacitance of the circuit may be analyzed. For this sensor, the parasitic capacitance from the copper trace at an output terminal 445 is approximately 30 pF. Using the SPICE simulator, the parasitic capacitance 430 at the output terminal was included, and the Fall-curve was re-evaluated. When the parasitic capacitance 430 is considered, the Fall-curve characteristics of the soil moisture sensor in simulation 455 and experiments 460 align quite well as seen at graph 450 in FIG. 4B. The results can be also represented by multiplying Eq. 1 by $e^{-t/C_p}$. The Fall curves of any sensor can be modeled by analyzing the sensor circuity obtained from the datasheet.

A typical IoT device consists of multiple ports to which various sensors are connected. The measured raw sensor data at each port is then processed either locally or transmitted to the cloud for human-interpretability. The processing formula for this raw sensor data is dependent on the sensor type and the manufacturer. For example, two temperature sensors from different manufacturers can have different processing formulas. Hence, if one mistakenly connects a sensor to a wrong port (during sensor attachment or replacement), the IoT device still continues to get raw data from the sensor, however, the raw data is incorrectly processed due to the application of wrong processing formula. This necessitates knowing the <sensor,port> information, i.e., the port to which a particular sensor is connected, for correctly processing the raw sensor data.

Sensor misconnections may be detected as well by analyzing fall-curve data. In particular by utilizing Fall-curves of sensors. The Fall-curves may be unique for each different type of sensor, and may also be unique for the same type of sensor from two different manufacturers. These properties ensure each sensor type has a unique Fall-curve, which can be used to identify the sensor attached to a port. To show the effectiveness of sensor identification, an experiment was performed using an IoT device that is monitoring ambient light and temperature every 15 minutes in a building.

Figure 5A:
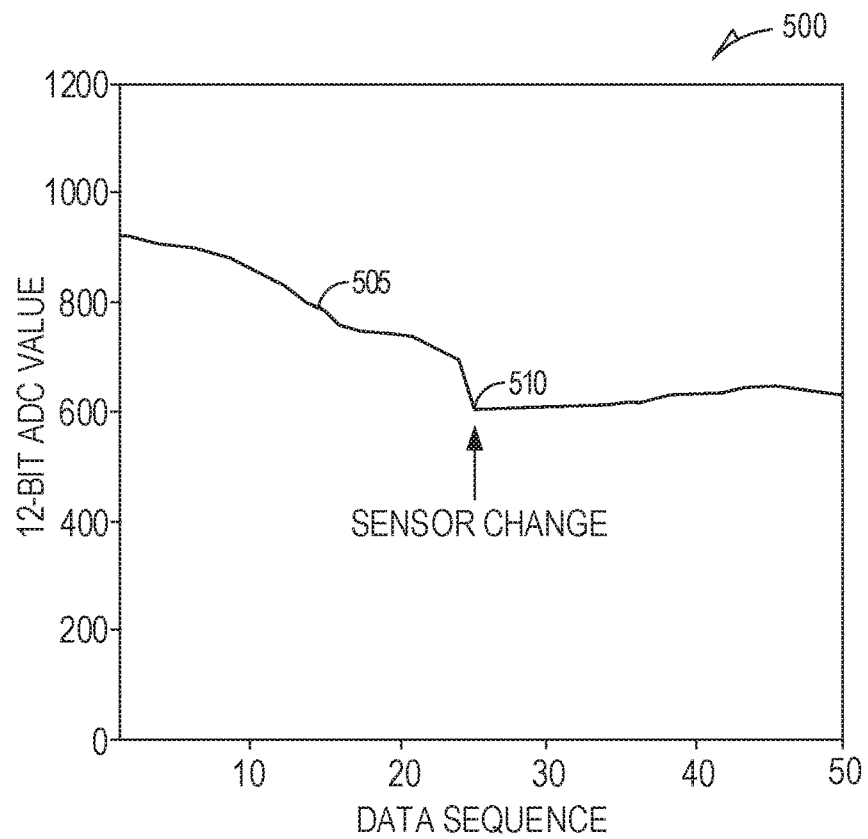
FIGS. 5A, 5B, 5C, and 5D are graphs illustrating sensor port mismatch and identification according to an example embodiment.
Figure 5B:
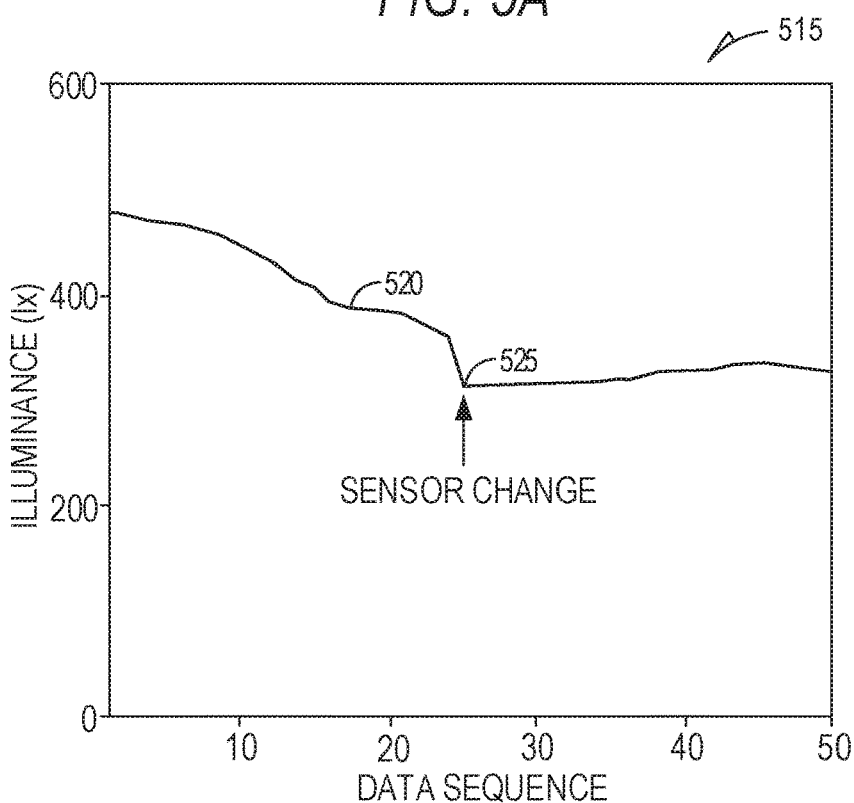
Figure 5C:
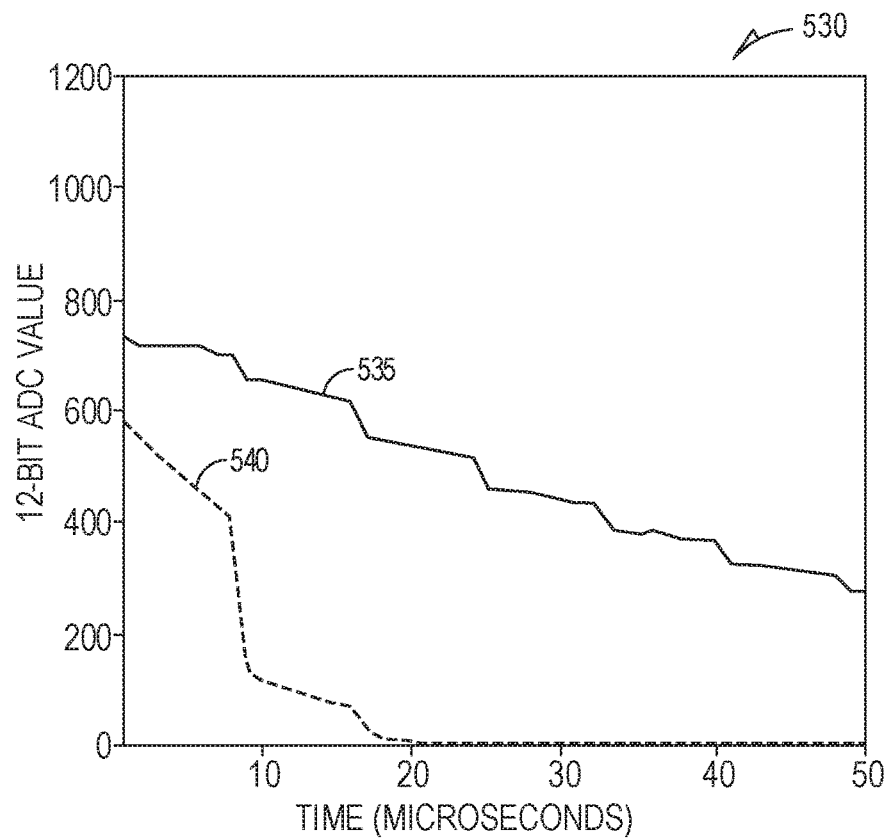
Figure 5D:
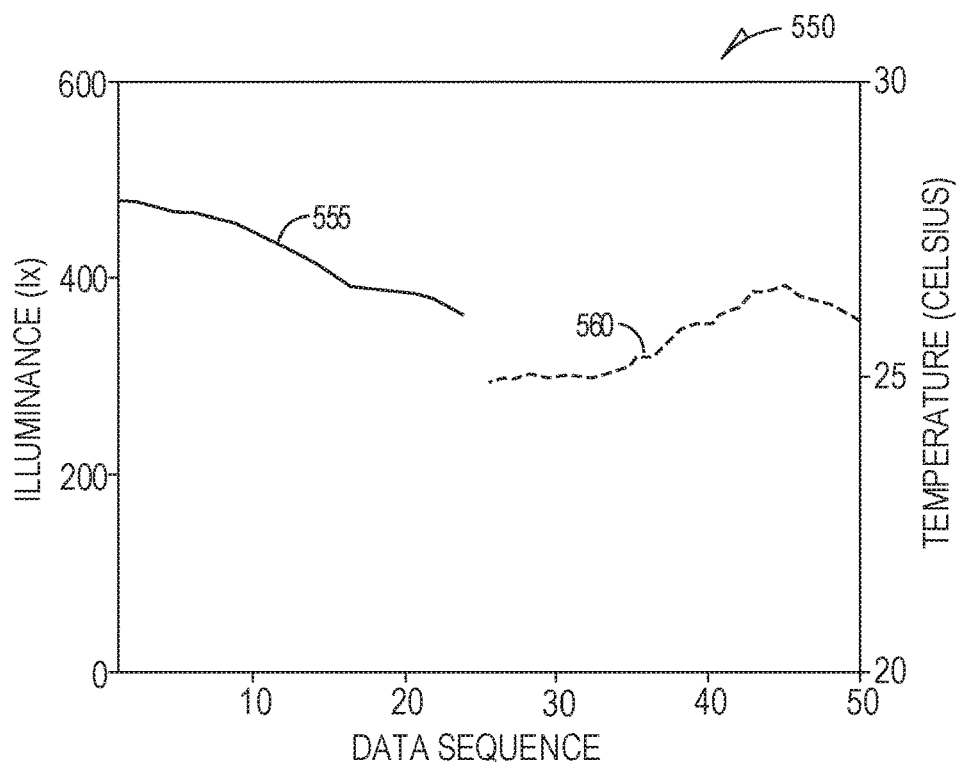

FIG. 5A is graph 500 illustrating the analog sensor value shown at curve 505 of a light sensor attached to an IoT device on Port 1. The x-axis indicates the data sequence where each point indicates 15 minutes time interval. FIG. 5B is a graph 515 showing the corresponding human-interpretable sensor data in illuminance (1×) 520 after applying the sensor-specific processing formula (obtained from the datasheet). After some time period, the light sensor is replaced with a temperature sensor, specifically at data sequence 24 as shown at 510 and 525 in FIGS. 5A and 5B. One cannot determine if there is a fault in the sensor data as the data is well within the permissible range of the light sensor. In such cases, the proposed Fall-curve based technique can identify the sensor attached to the port as the Fall-curves obtained before and after sensor change should be significantly different. Thus, by periodically turning off power to the sensor and measuring the fall curve, the measured Fall-curve may be compared with previous Fall-curve measurements to determine a misconfiguration. FIG. 5C graph 530 shows distinctive Fall-curves before (LDR light sensor) at 535 and after (temperature sensor) at 540 the sensor change. The illustrated difference in the fall curves demonstrates that a sensor port change can be reliably detected. An alert may be raised, or one can automatically detect the new sensor connected to the port and adapt the appropriate processing formula. FIG. 5D at graph 550 shows the human-interpretable sensor data before at 555 and after at 560 automatically applying the correct processing formulas upon detection of sensor change.

There are two main types of sensors: analog and digital sensors. Analog sensors generate a continuous output signal which is typically proportional to the value being measured. They interface with a microcontroller through an ADC. Digital sensors produce a discrete digital output signal and interface with the microcontroller using a digital communication protocol, e.g., I2C, RS485, SPI, etc. Fall-curves may be used to accurately detect faults in analog and digital sensor.

In addition to detecting misconfigurations, fall-curves may be utilized to detect faulty sensors. To evaluate Fall-curves for faulty devices, such as sensors, faults may be manually injected in the sensor by physically damaging sensors or exposing to heat, or passing current with high voltage, etc., which occurs commonly in an IoT deployment.

Figure 6A:
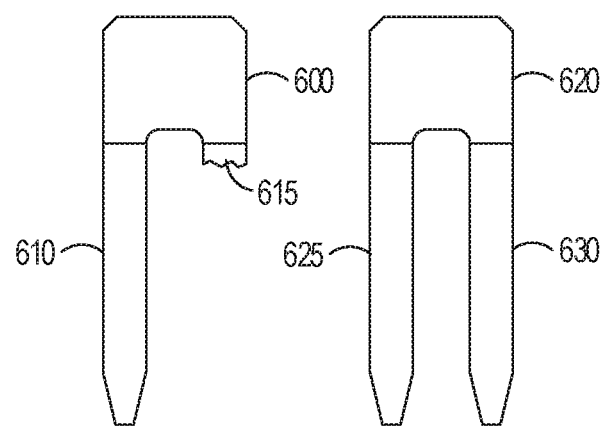
FIGS. 6A and 6B illustrate a broken sensor and associated Fall-curves according to an example embodiment.
Figure 6B:
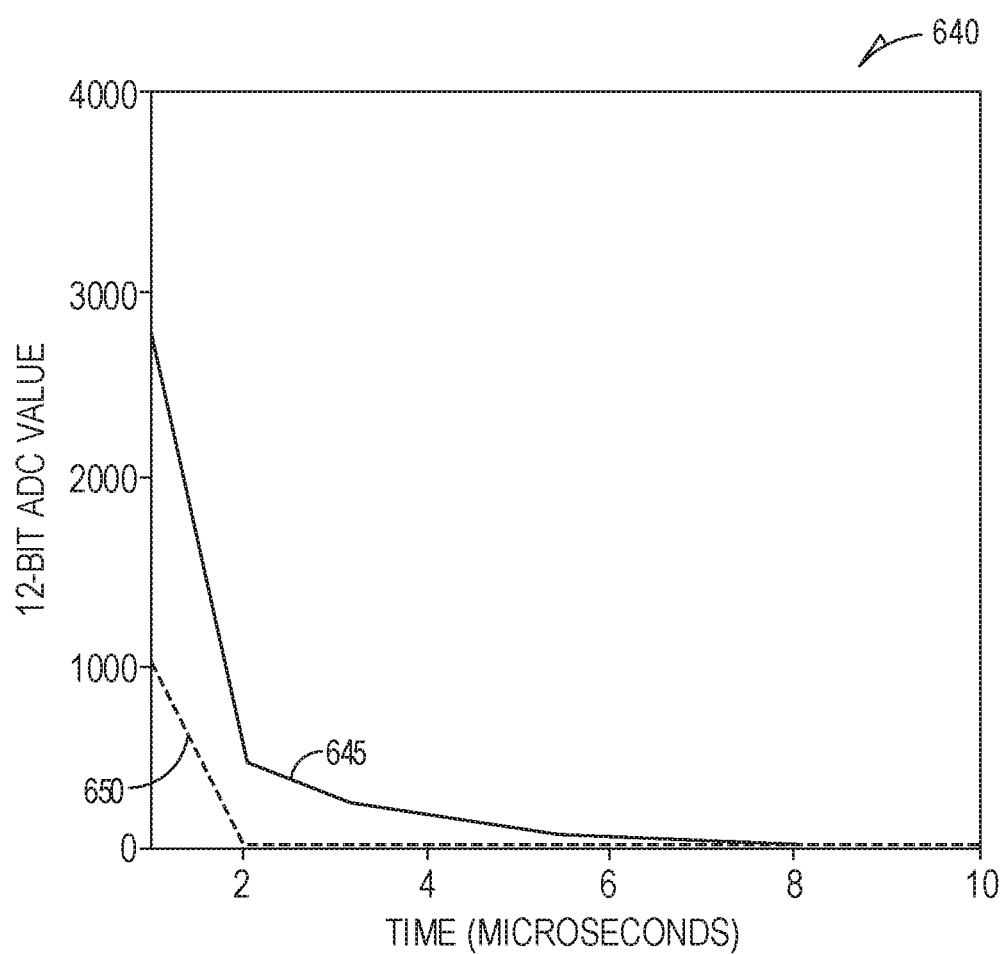

FIG. 6A at 600 shows a broken (faulty) and working soil moisture sensor having a single complete prong 610 spaced from a broken prong 615. An unbroken sensor is shown at 620 having two complete spaced apart prongs 625 and 630. FIG. 6B at graph 640 shows the corresponding Fall-curves 645 and 650. The Fall-curve 650 for the broken sensor 600 is significantly different from that of a working sensor Fall-curve 645, which can be used to determine faulty sensors.

Figure 7:
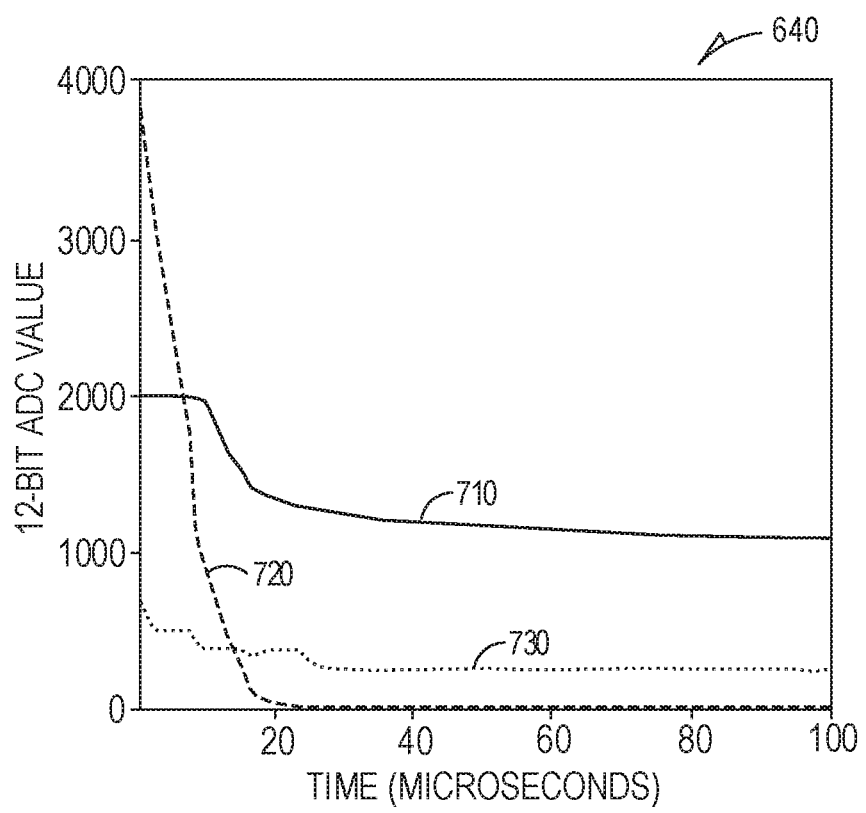
FIG. 7 illustrates a manually injected accelerometer fault and associated Fail-curves according to an example embodiment.

FIG. 7 is a graph 700 showing three different Fall-curves for a working accelerometer sensor, a faulty accelerometer sensor, and an open port respectively at 710, 720, and 730. The fault was produced by applying a high voltage beyond the accelerometer sensor tolerance limit. Note that, in both of the scenarios of the soil moisture sensor and the accelerometer sensor, the damaged/faulty sensor was generating some sensor data in the valid data range.

Where the port is open, the sensor device still reads some data, as the port acts as an antenna and picks some signal from the PCB traces. Fall-curve 730 shows distinctive Fall-curves when the ADC port is open and when the port is connected to a working sensor, Fall-curve 710. Thus, a Fall-curve can identify faults in analog sensors without any additional hardware or contextual information about the IoT sensor deployment.

Figure 8:
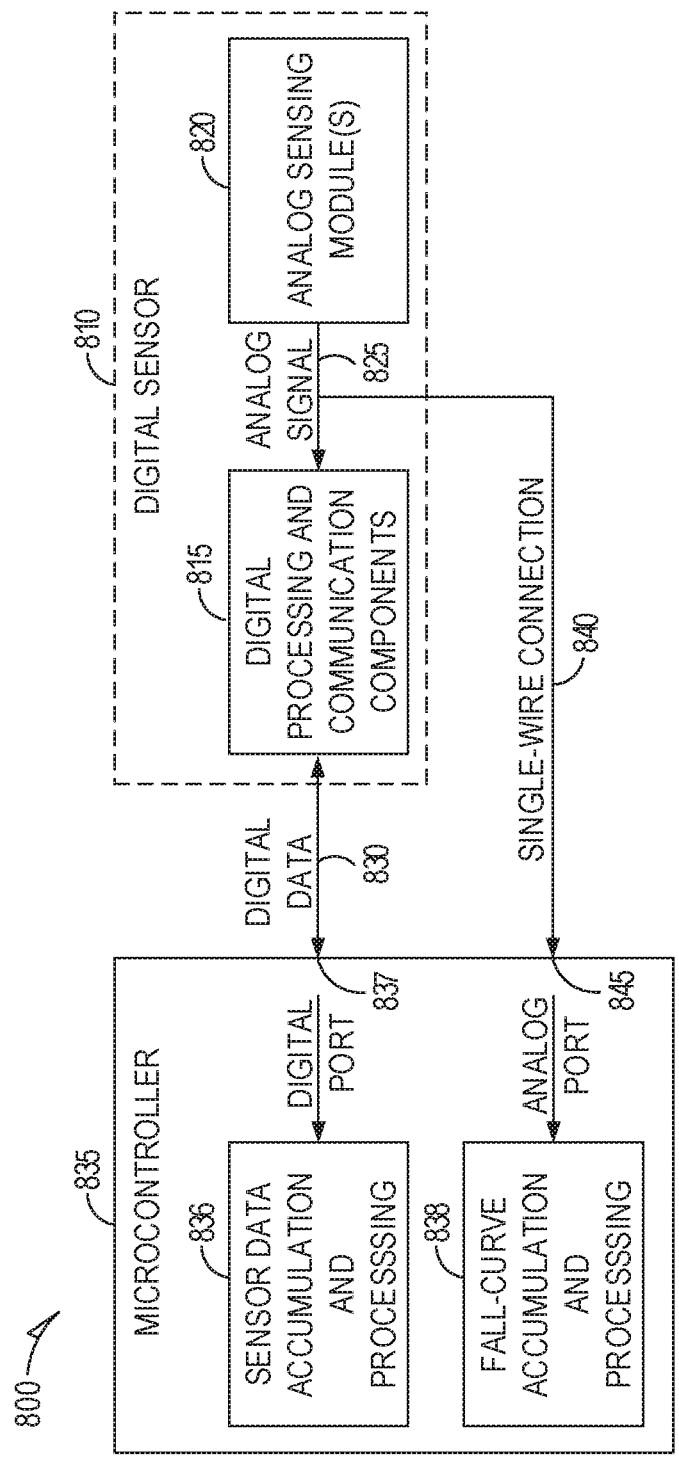
FIG. 8 is a block diagram of a digital sensor modified for Fall-curve measurement according to an example embodiment.

FIG. 8 is a block diagram of a digital based sensor system 800 having a digital sensor 810 with two main components, a digital block 815 and an analog block 820. The digital block 815 may include digital data processing circuitry, a communication unit, memory, and internal ADC. The analog block 820 contains one or multiple analog sensing modules, also indicated at 820. The measurement of sensing phenomenon begins as an analog signal 825 produced by one or more of the analog sensing modules 820, which is then converted into a digital signal 830 through ADC in the digital block 815, and transmitted to an external microcontroller 835. The external microcontroller has a sensor data accumulation and processing block 836 coupled to a digital port 837 for receiving the digital signal 830. Microcontroller 835 also includes a Fall-curve accumulation and processing block 838 for receiving analog data from the analog block 820.

In a faulty digital sensor, any or both of the blocks 810 and 815 can fail. If the digital block 815 of the sensor is faulty, it can easily be detected as the sensor stops responding or transmits default out-of-service value. However, if the analog block 810 is faulty, the digital block 815 continues to process and transmit the faulty signal from the analog sensing module(s). While Fall-curve based fault detection of the analog sensor is possible, the external microcontroller 835 does not have access to the analog block 825 of the digital sensor 810. A connection 840, such as a single wire connection 840 between the analog sensing module 820 and an ADC port 845 of the external microcontroller 835 is used to provide Fall-curve analog data.

Note that this single-wire connection does not have any influence on off-the-shelf digital sensor data communication. The single-wire connection is only utilized in one embodiment to accumulate Fall-curve data when the sensor is turned off. Thus, faults can be detected in a digital sensor at both, (i) digital block 815: checking for response from the digital block and (ii) analog block: by accumulating the Fall-curve.

Figure 9A:
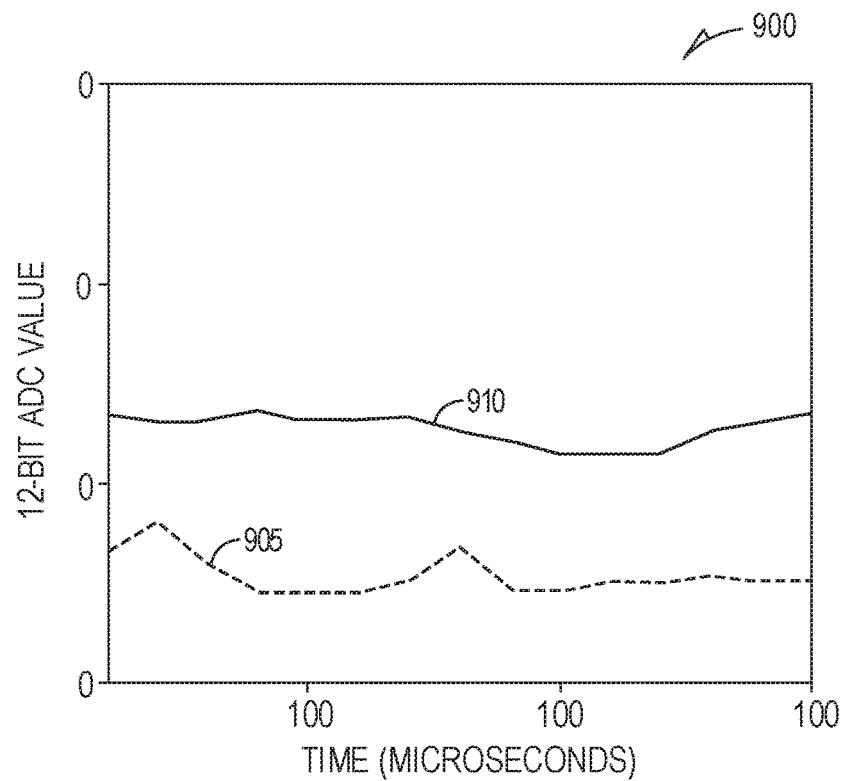
FIGS. 9A and 9B illustrate sensor data and Fall-curve data for a temperature sensor according to an example embodiment.
Figure 9B:
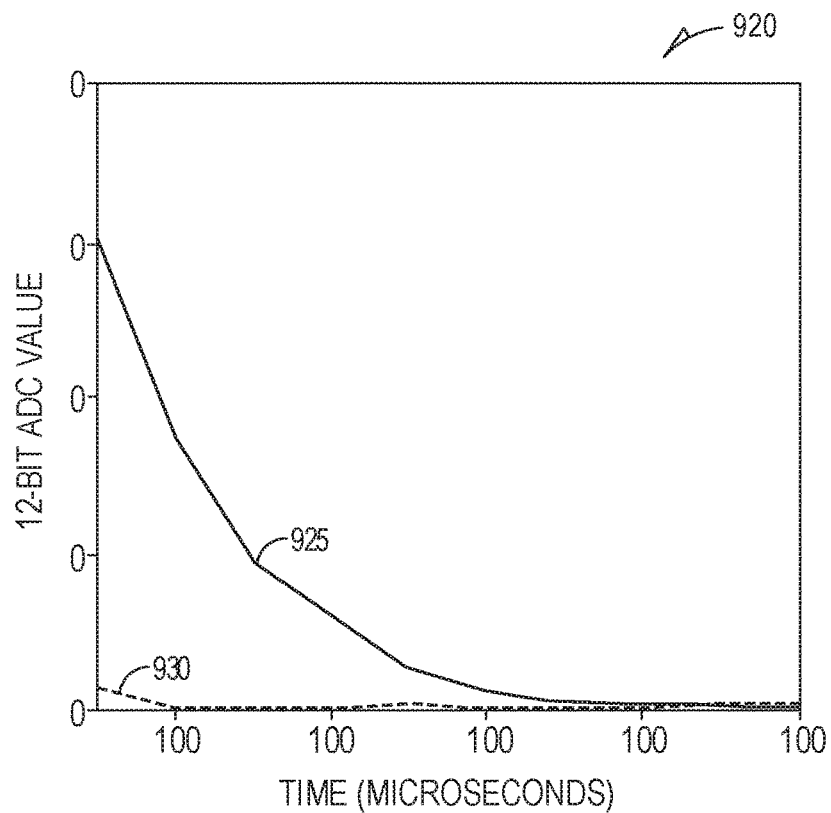

FIG. 9A is a graph 900 showing output of an instance of faulty 905 and non-faulty 910 DHT sensor where the x-axis shows the time in hours and the y-axis shows the temperature values in degree Celsius. On one of the DHT sensors, the analog temperature module (thermistor) was replaced with a faulty thermistor. While the temperature readings from both the sensors look normal (within valid range), upon analyzing the Fall-curves shown in graph 920 in FIG. 9B at working curve 925 and faulty curve 930, one of the DHT sensors may be detected as faulty. This fault could not have been detected using any other techniques unless having more co-located sensors.

Figure 10:
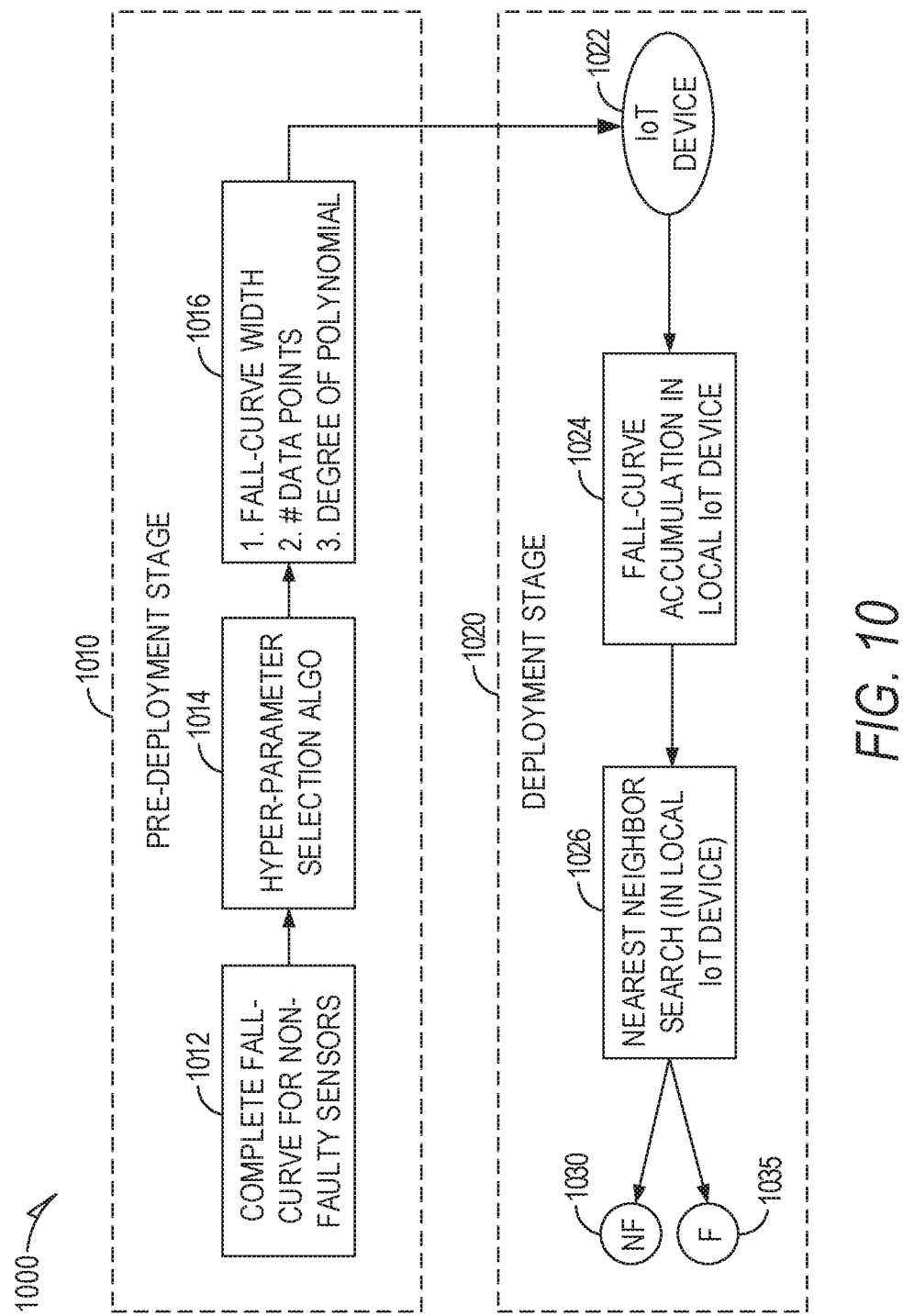
FIG. 10 is a block diagram of a Fall-curve processing pipeline according to an example embodiment.

In one embodiment, an edge machine learning algorithm that can run on the microcontroller in real-time may be used to (i) determine if the sensor is faulty or non-faulty and (ii) identify the sensor. As mentioned earlier, the Fall-curve is collected for a short period of time when the sensor is turned off. An edge algorithm pipeline 1000 with two stages is shown in FIG. 10. A pre-deployment stage 1010 collects and analyzes Fall-curves for each sensor to extract key features. A deployment stage 1020 matches features from a new Fall-curve with the previously extracted features to detect and isolate faults.

Stage 1010 collects at 1012 the Fall-curves for all non-faulty sensors used in an IoT deployment. The best feature vectors that can be used to represent a Fall-curve are then found at 1014. These feature vectors are further optimized at 1016 to derive a feature dictionary for all sensors that can be loaded into the microcontroller towards sensor identification and fault detection.

When installing the sensors for the first time the Fall-curves of the non-faulty sensors and their corresponding sensor label are obtained at 1012.

A polynomial curve is fit to each Fall-curve time-series and is used to find the corresponding polynomial coefficients as the feature vector. Clustering is performed on these polynomial features at 1014 for each sensor to identify the unique features. This significantly reduces the search space and generates a smaller dictionary of polynomial features.

Considering the resource and power constraints of the IoT devices, a set of hyper-parameters viz., Fall-curve width, degree of polynomial, and number of clusters is derived at 1016.

The resulting feature dictionary along with the chosen hyperparameters is then loaded onto the IoT devices at 1022 for real-time Fall-curve analysis in stage 1020.

Note that, the aforementioned pre-deployment steps are performed with only non-faulty sensors before deploying in the field.

In the deployment stage 1020, the polynomial features of a new Fall-curve are extracted at 1024, and its nearest neighbor is found at 1026 from the feature dictionary obtained during the pre-deployment stage. If the nearest neighbor distance is within a certain threshold the Fall-curve is classified as working or not faulty (NF) at 1030 and assign the corresponding sensor label. Otherwise, the sensor is classified as faulty at 1035 and the Fall-curve may be sent to a gateway/cloud for further processing. The nearest neighbor search is performed locally on the IoT devices using an efficient algorithm such as ProtoNN.

In one embodiment, the edge algorithm enables IoT or other device designers to trade-off accuracy based on resource and power constraints on the device. There are three hyper-parameters that can be fine-tuned based on the fault detection accuracy to allow the trade-off, Fall-curve width, polynomial degree, and number of clusters.

Figure 11A:
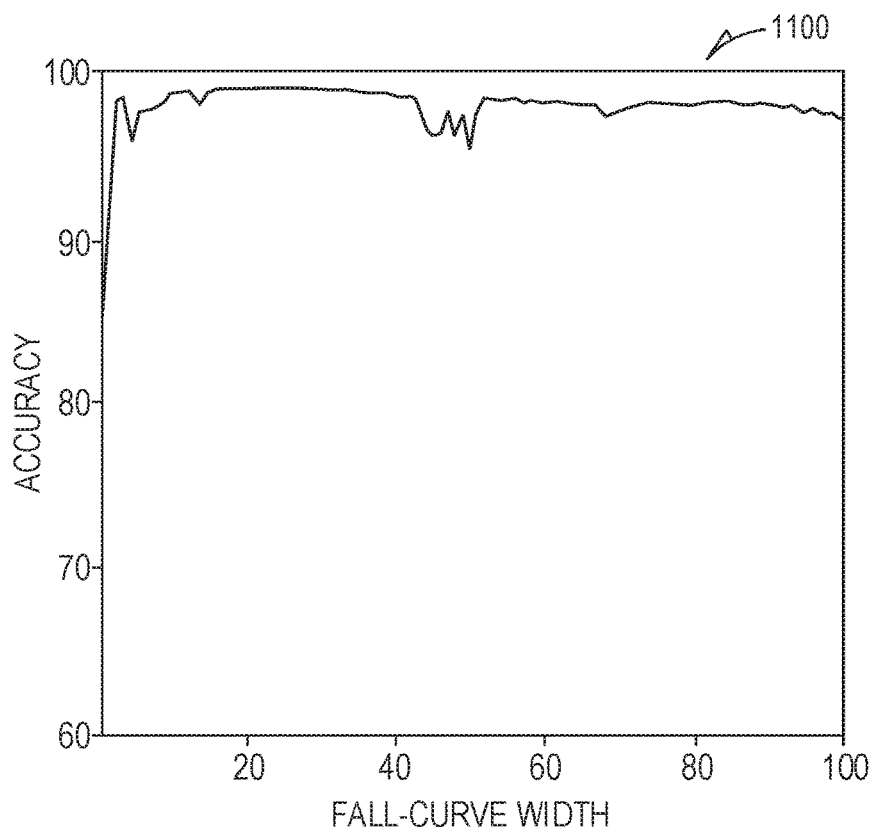
FIGS. 11A, 11B, and 11C are graphs indicating Fall-curve width, polynomial degree, and clustering according to an example embodiment.

(i) Fall-curve width: Each Fall-curve has a different fall-time to reach zero. Intuitively, the larger the Fall-curve width the higher is the time and energy required to process the Fall-curve samples. FIG. 11A is a graph 1100 of Fall-curve width versus accuracy, showing the trade-off in the accuracy of detecting a sensor for varying Fall-curve width. Accuracy saturates after Fall-curve width of just 10 samples, indicating, the polynomial curve fitting is able to capture the key features of the Fall-curve with just a few samples.

Figure 11B:
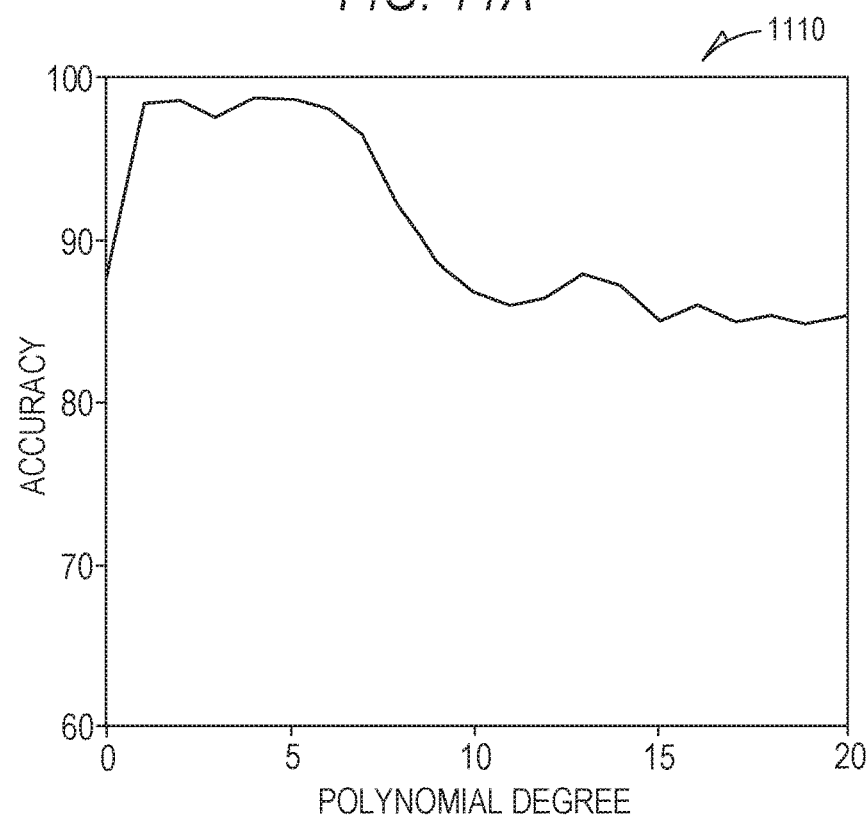

(ii) Polynomial degree: In general, as the polynomial degree is increased, the accuracy also increases up to a certain extent. However, the higher the polynomial degree the higher is the resource requirement. FIG. 11B is a graph 1110 of polynomial degree versus accuracy, shows the detection accuracy across different polynomial degrees. Up to polynomial degree of 8, the accuracy is close to 98%, after which the accuracy drops. This accuracy drop indicates that the higher polynomial degrees are not able to capture any new information in the Fall-curve.

Figure 11C:
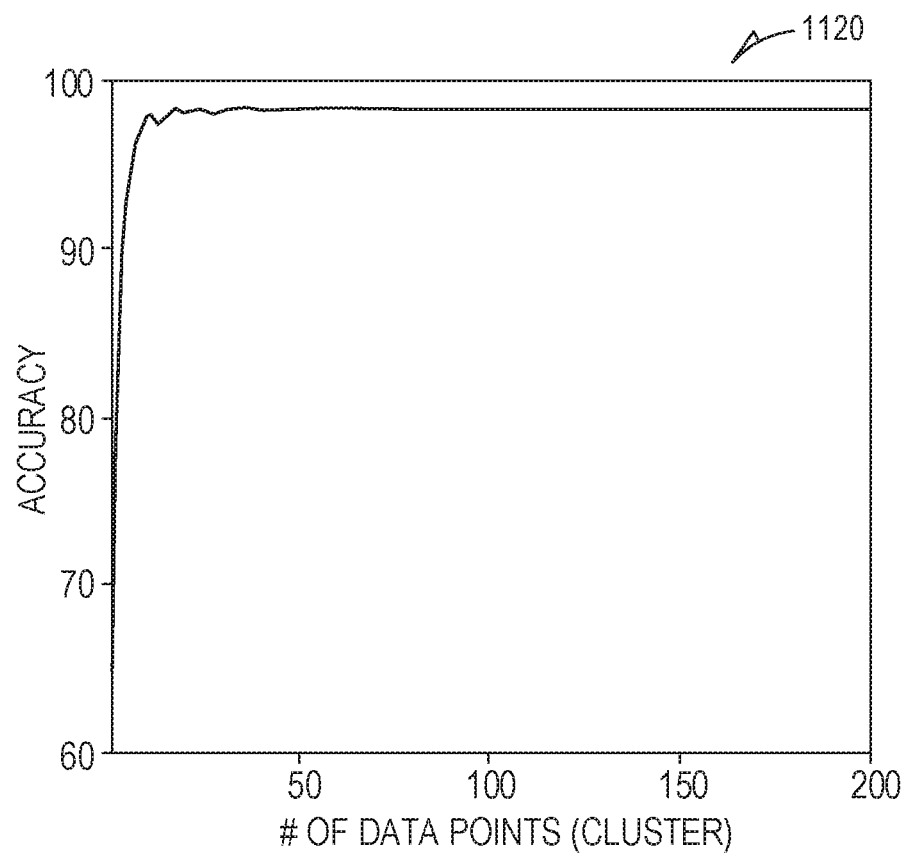

(iii) Number of clusters: A Fall-curve for the same sensor might have some variations resulting in different polynomial coefficients/features. To eliminate this variation, clustering may be performed across all polynomial features obtained for a particular sensor. Clustering results in a set of optimal polynomial features for each sensor. A lower number of clusters reduces the time required to match the polynomial features. FIG. 11C is a graph 1120 of the number of clusters versus accuracy across varying number of clusters. The accuracy saturates after the number of clusters is greater than 10 in one embodiment.

In one embodiment, a Fall-curve width of 10 samples and polynomial degree of 4 with 10 clusters provides a good tradeoff between accuracy and computing resources. These numbers may vary in further embodiments.

Different methods for Fall-curve based fault analysis may be used to allow designers to trade off accuracy, granularity of fault analysis, and power consumption to determine the quality of data as required by their particular device.

Sampling interval triggered fault analysis. The number of sensor readings taken by an IoT device is governed by the sampling interval. Generally, the sampling interval is set based on the application scenario and power requirements. Fall-curve based fault analysis can be triggered based on the sampling interval that is controlled with a rate parameter (r), which determines the granularity for fault analysis. If r=1 fault analysis is triggered for every sensor reading, which is beneficial for IoT applications that require highest data fidelity, for example, when the phenomenon being monitored continuously varies. Similarly, r=100 implies fault analysis performed on every 100th sensor reading. A low rate parameter has a bearing on power consumption, however, supports higher accuracy. A high rate parameter comes up with a probability of missing faulty data points from being probed, which may be acceptable if the required data fidelity is not high. Upon detection of a fault, this method adapts the rate parameter to a lower value in order to aggressively probe for faults, otherwise, it maintains the pre-defined rate parameter.

Event triggered Ault analysis. In this method, the sensor data is analyzed to identify an outlier event. Upon detecting an outlier event, Fall-curve based fault analysis is triggered for a definitive answer. Outlier detection could be a simple rule-based detection to complex Hidden Markov Models (HMM) or artificial neural networks. Note that, this fault analysis method is only triggered based on an investigation on sensor data. As described earlier, there are scenarios where faulty sensor data can mimic non-faulty sensor data. While this method is efficient in detecting faults when the sensor data has an outlier, it may miss probing faulty data points in the aforementioned scenarios.

Hybrid fault analysis. This method combines both sampling interval triggered and event triggered fault analysis methods. A Fall-curve based fault analysis is triggered on a particular interval defined by the rate parameter, or after an outlier event detection in sensor data. Hence, the method decreases the chance of missing faulty data points from being probed compared to the two aforementioned methods, and thus increases the accuracy. In addition, the method is power-efficient compared to the sampling interval triggered fault analysis having a low valued rate parameter. Upon detection of a fault, this method also adapts the rate parameter to a lower value in order to aggressively probe for faults.

In further embodiments, machine learning systems, such as neural network models, may be used to both identify sensors and sensor faults utilizing training data that includes time series sampled data from Fall-curves. The use of such models may utilize more computing resources and power than that available in IoT device sensors, so the time series sampled data may be transmitted to network/cloud-based resources for processing.

Many different faults may be encountered during device deployment. The following paragraphs describe how Fall-curve based techniques may be used to detect and isolate these faults.

Figure 12A:
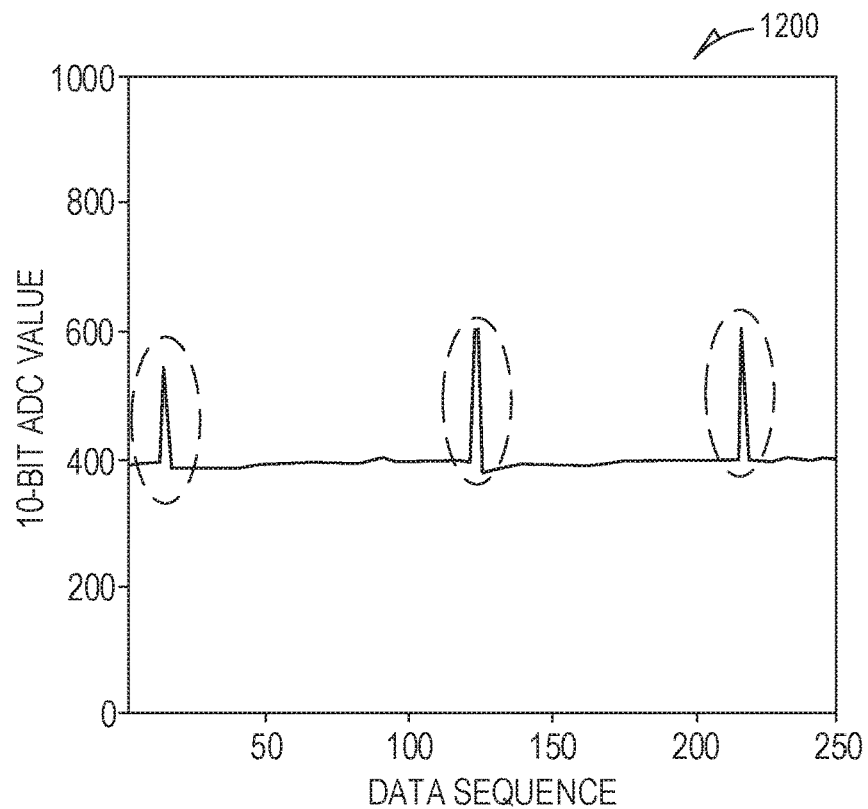
FIGS. 12A, 12B, 12C, and 12D illustrate sensor node internal components and deployed sensors according to an example embodiment.
Figure 12B:
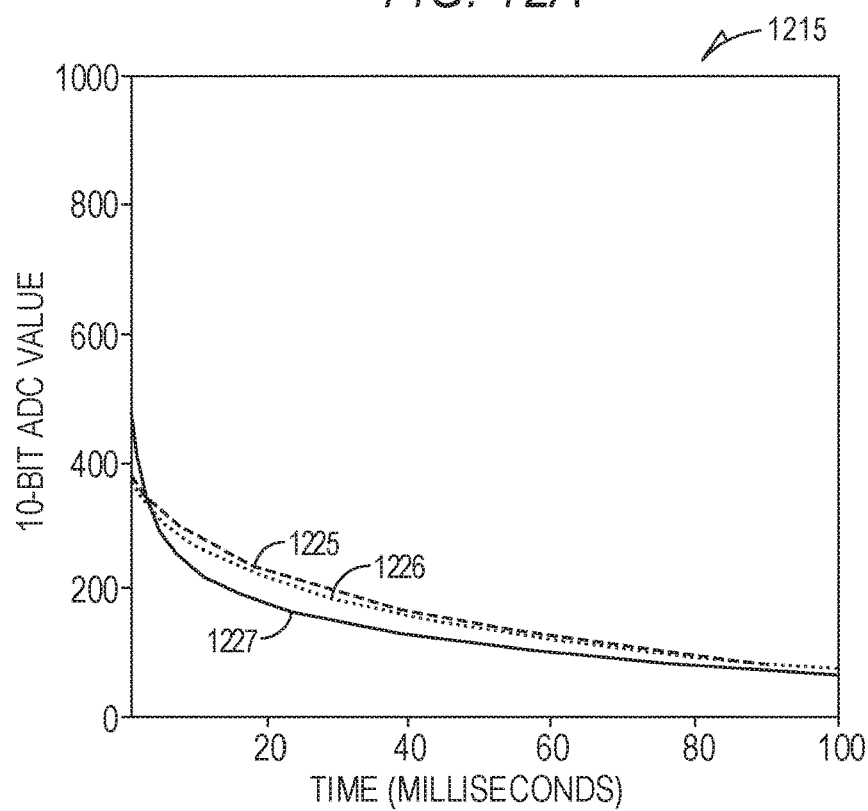
Figure 12C:
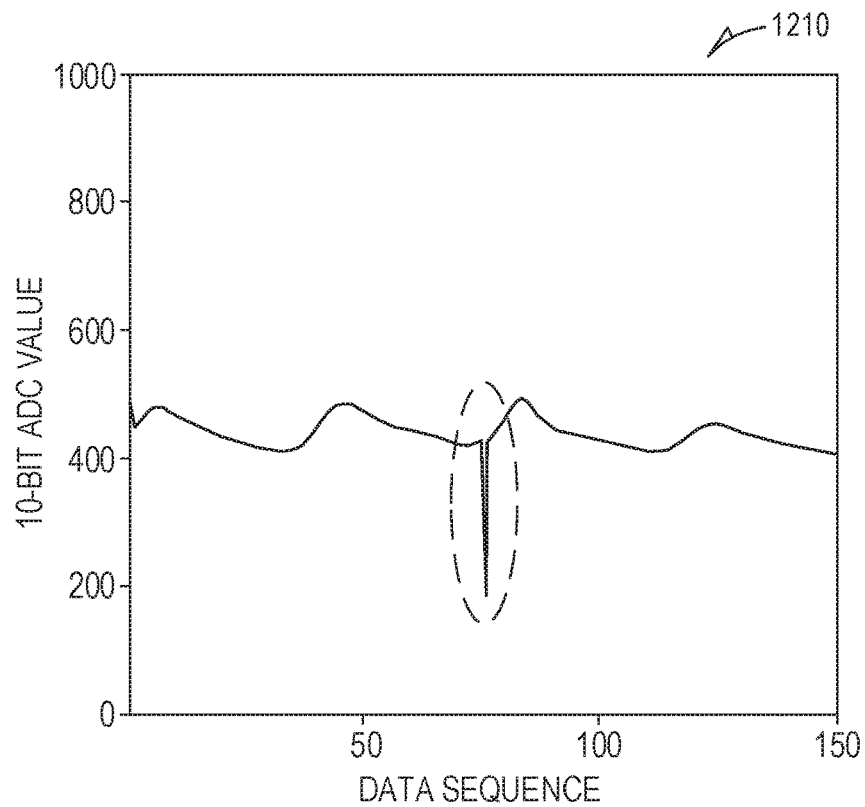
Figure 12D:
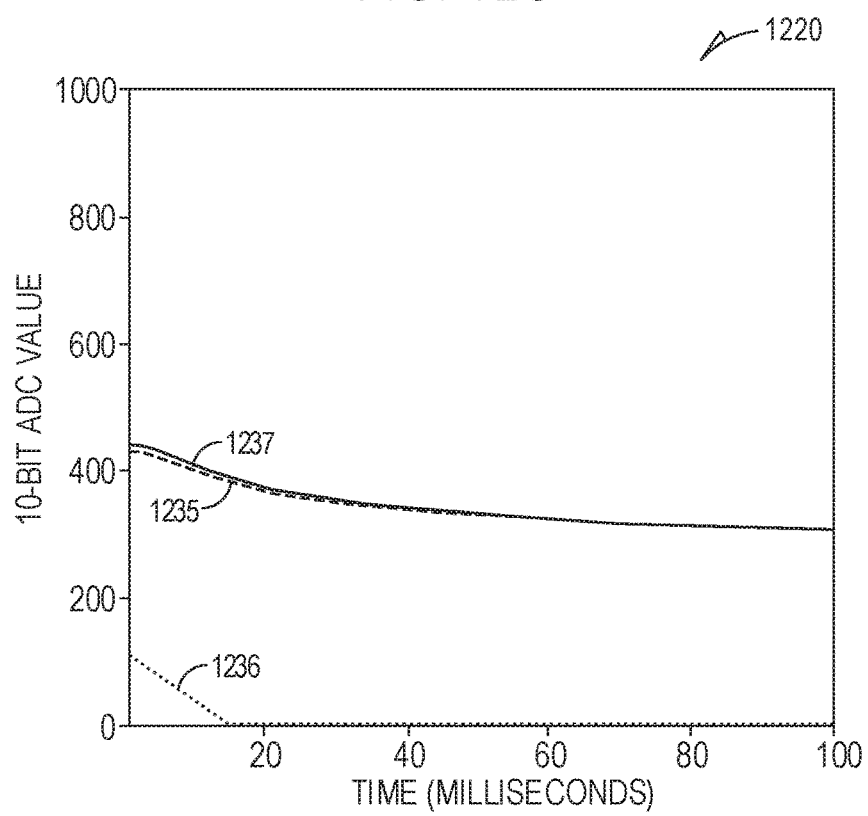

6.2.1 Short fault. FIGS. 12A and 12C are graphs 1200 and 1210 illustrating data sequences showing short fault instances in a soil moisture sensor (Gravity) and a soil temperature sensor respectively. The x-axis represents the data sequence where each point represents a 2-hour time interval. It can be seen that the soil moisture data in 12A is generally stable as these are rain-fed farms with an occasional short fault. Similarly, in FIG. 12C the diurnal pattern of soil temperature data is observable. FIGS. 12B and 12D are graphs 1215 and 1220 showing the corresponding Fall-curves accumulated from the sensors just before, during, and after the short fault instance. The Fall-curves in FIG. 12B are before fault 1225, during fault 1226, and after fault 1227. The Fall-curves in FIG. 12D are before fault 1235, during fault 1236, and after fault 1237. In these instances, though all the system components were working fine, both the sensors had a transient malfunction. It can be seen that, during the Short fault, the corresponding Fall-curves are different and the system was able to detect these transient sensor malfunctions. The transient sensor malfunction could be due to the environmental factors, etc.

Figure 13A:
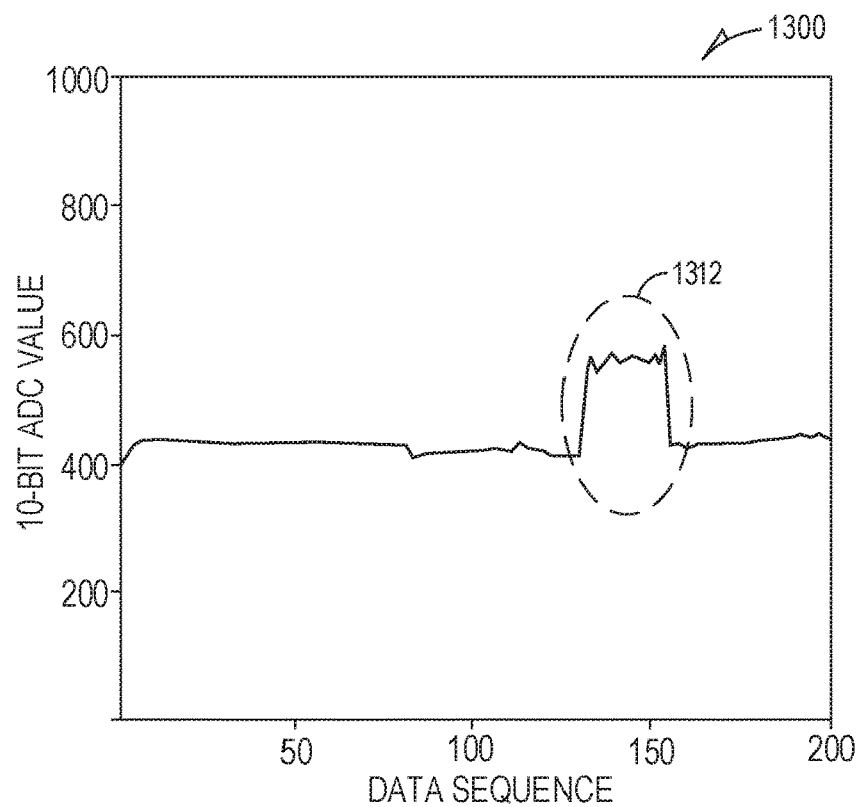
FIGS. 13A, 13B, 13C, and 13D are graphs illustrating short faults and corresponding Fall-curves according to an example embodiment.
Figure 13B:
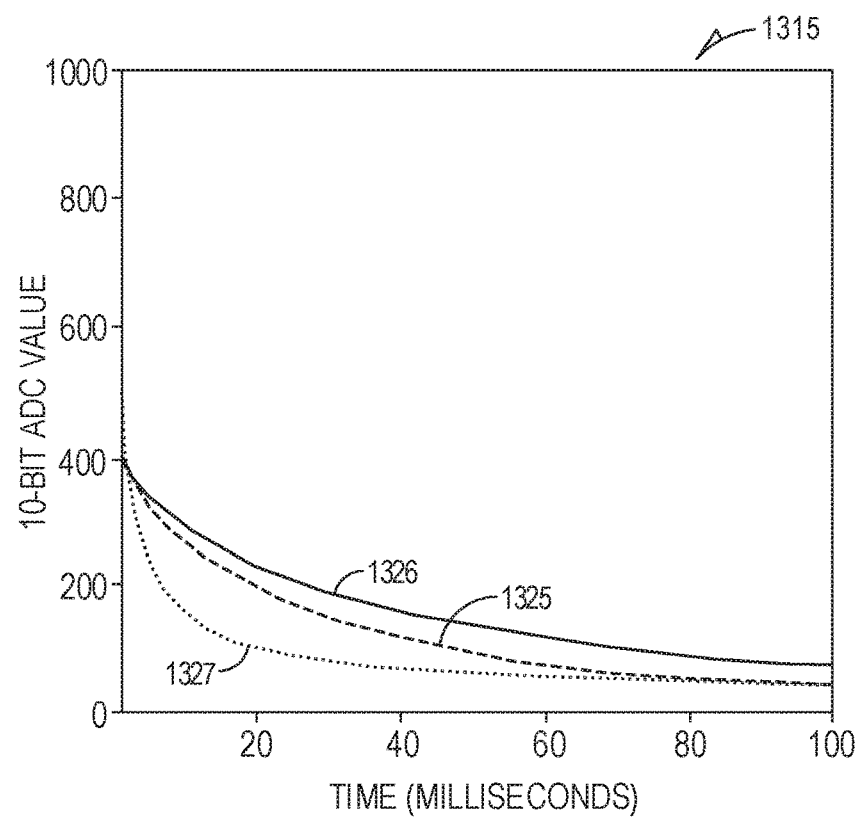
Figure 13C:
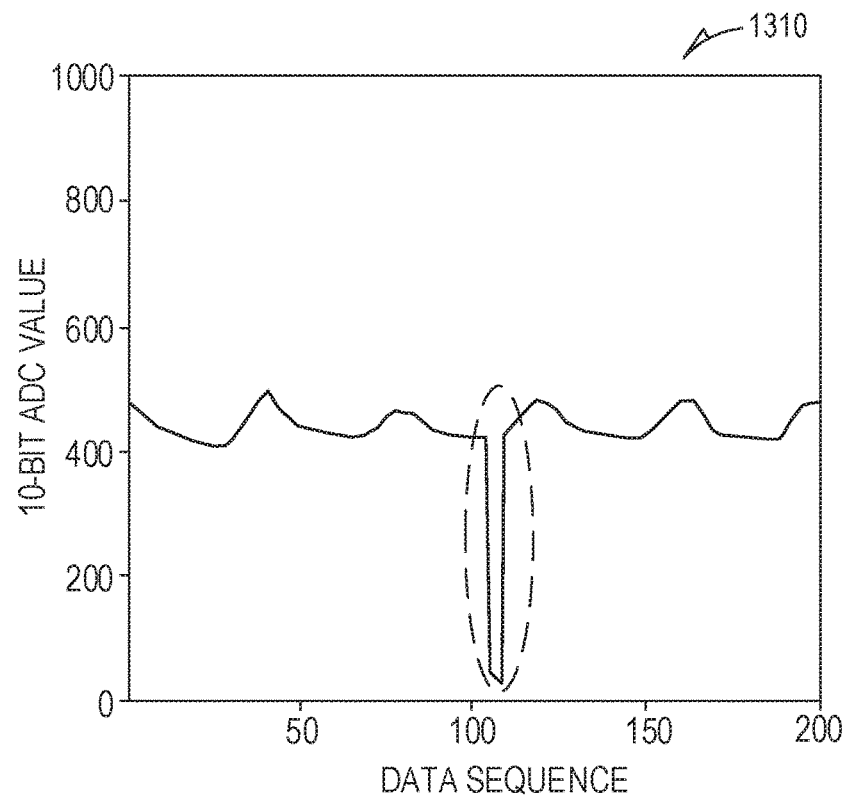
Figure 13D:
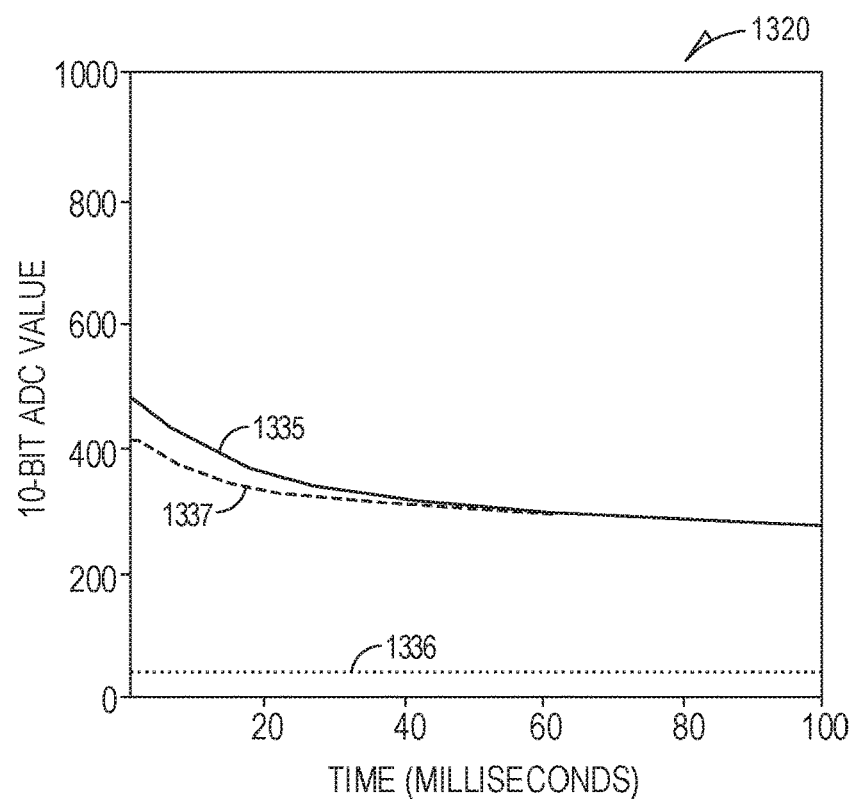

Spike fault. FIGS. 13A and 13C are graphs 1300 and 1310 illustrating data sequences showing spike fault instances in a soil moisture sensor (Gravity) and a soil temperature sensor respectively. The x-axis represents the data sequence where each point represents a 2-hour time interval. The broken line circled 1312 region in FIG. 13A shows that the soil moisture data is high for over 2 days (24 data sequences). Data-centric techniques cannot determine if the sensor data is faulty or not in this scenario without contextual information. By analyzing the Fall-curves, the system identifies that the faults were due to transient malfunction of the sensor. FIGS. 13B and 13D are graphs 1315 and 1320 showing the corresponding Fall-curves accumulated from the sensors just before, during, and after the short fault instance. The Fall-curves in FIG. 13B are before fault 1325, during fault 1326, and after fault 1327. The Fall-curves in FIG. 13D are before fault 1335, during fault 1336, and after fault 1337. Mud on a sensor may be a cause of a spike fault. After removal of the mud, the fault is gone.

Figure 14A:
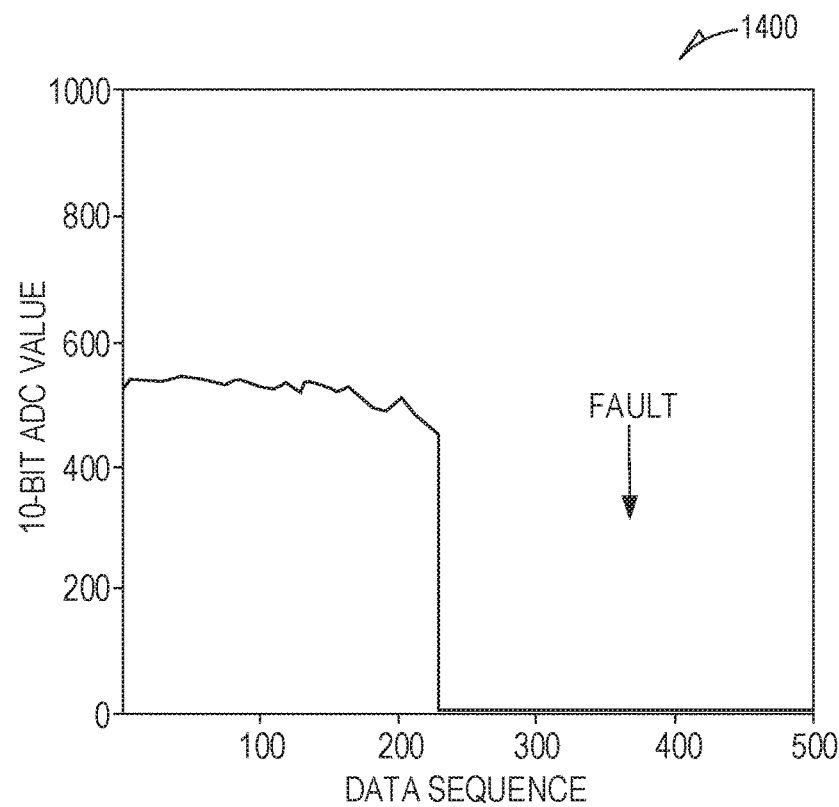
FIGS. 14A, 14B, 14C, and 14D are graphs illustrating spike faults and corresponding Fall-curves according to an example embodiment.
Figure 14B:
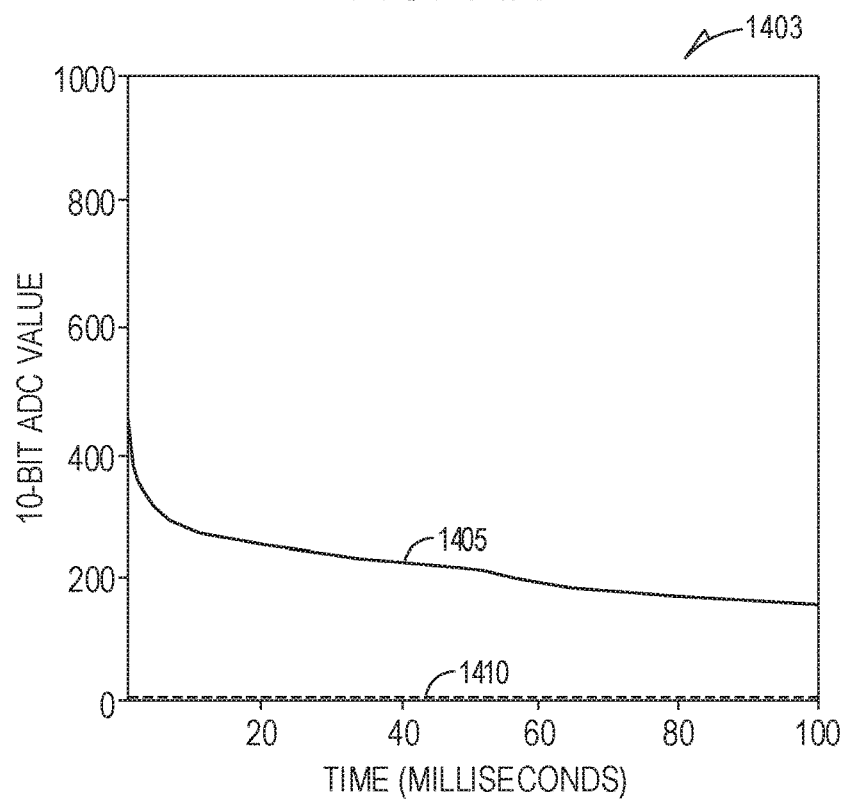

Stuck-at fault. FIG. 14A is a graph 1400 illustrating an instance of Stuck-at fault in soil moisture sensor. To determine if it is a sensor fault the Fall-curves shown in graph 1403 FIG. 14B at 1405 before 1410, after, and during 1415 the Stuck-at fault may be studied. FIG. 14B shows two significantly different Fall-curves 1405 and 1410 indicating a sensor failure. To understand the reasoning of sensor failure, logs stored in an onboard SI) card of the device may be reviewed. The stuck-at fault may be due to a battery voltage spike. This caused a permanent failure in soil moisture sensor. FIG. 14B shows the corresponding Fall-curves of not-faulty (before battery spike) and faulty (after battery spike) soil moisture sensor.

Figure 14C:
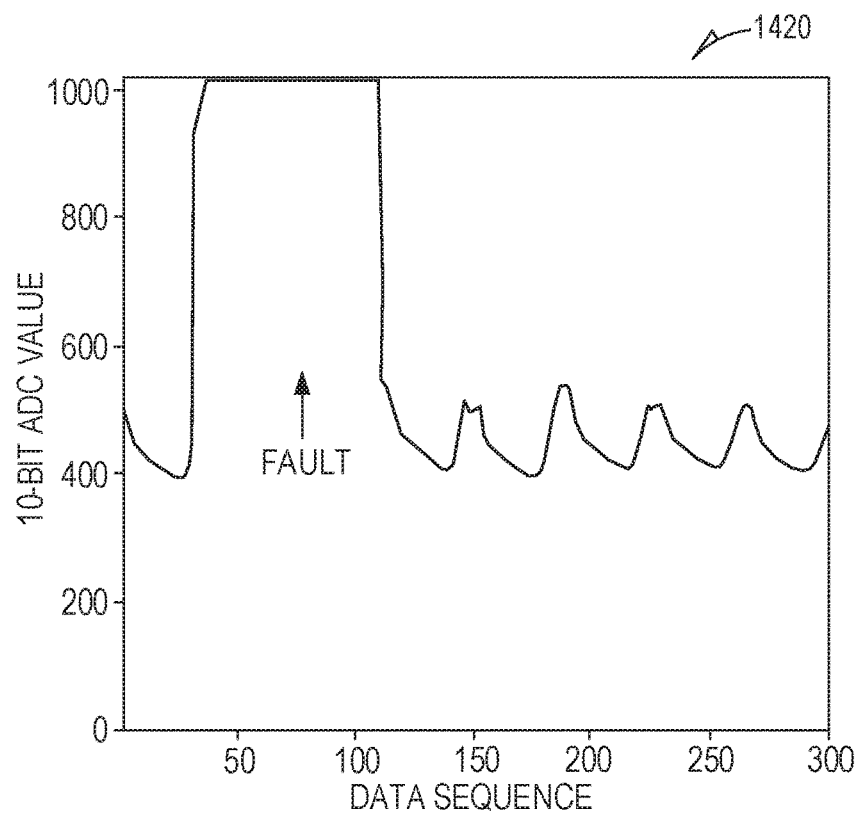
Figure 14D:
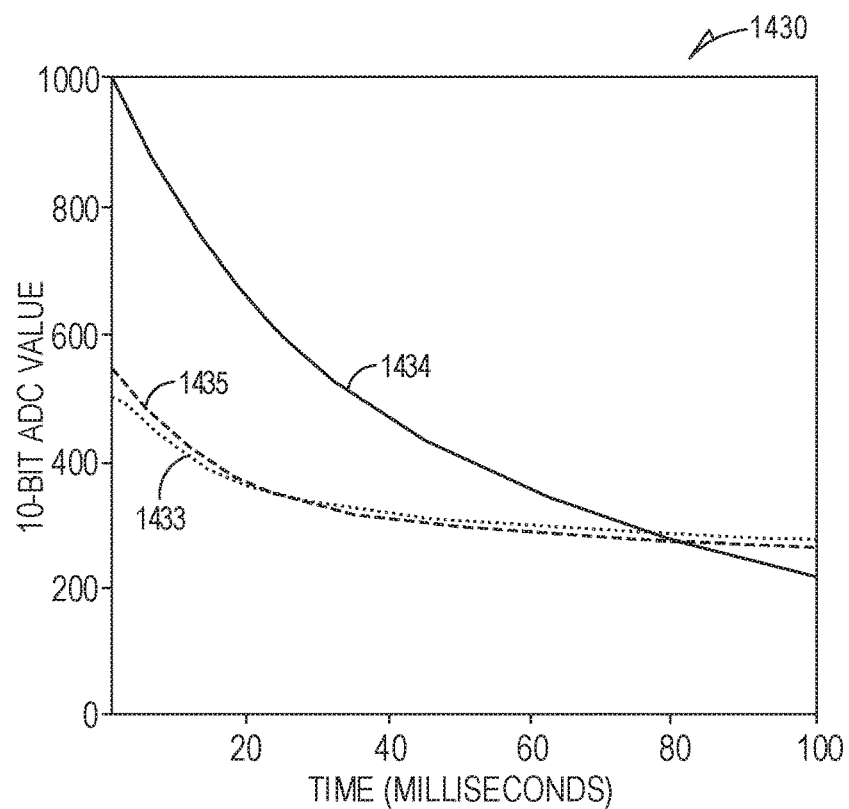

FIG. 14C is a graph 1420 illustrating another instance of Stuck-at fault, where a soil temperature sensor permanently went bad, An investigation revealed that some parts of the sensor wire had clear damage possibly due to rats chewing up the wire. After replacing the sensor, soil temperature value went back to the normal state. FIG. 14D is a graph 1430 showing that the Fall-curves for the initial working sensor (before fault 1433) and the replaced sensor (after fault 1435) are similar, whereas the Fall-curve 1434 in the faulty state of initial sensor is completely different.

Figure 15A:
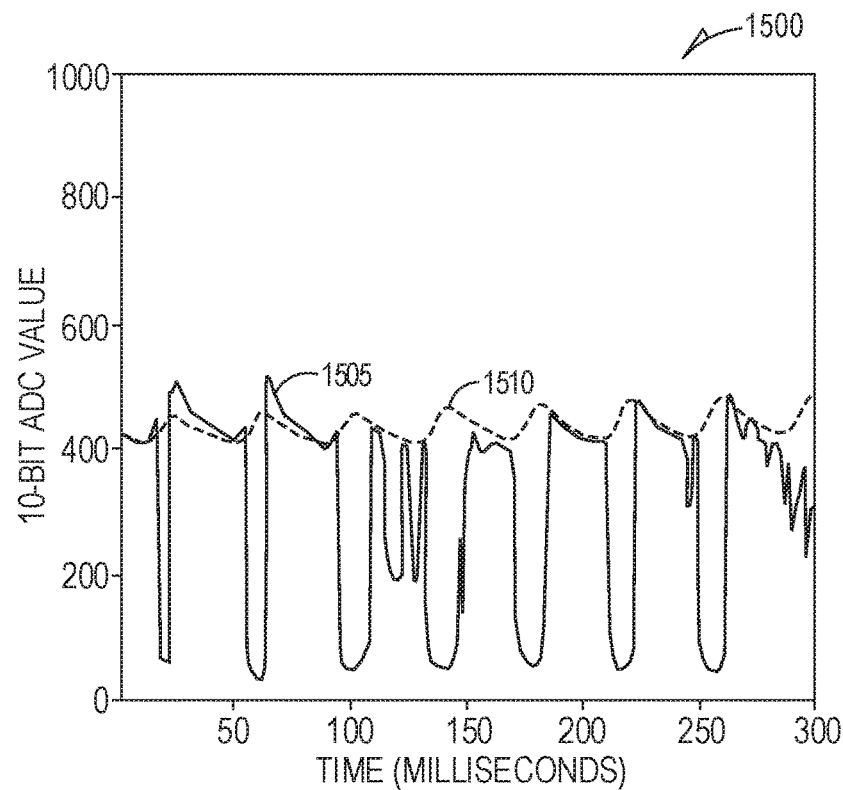
FIGS. 15A and 15B are graphs illustrating stuck-at faults and corresponding Fall-curves according to an example embodiment.
Figure 15B:
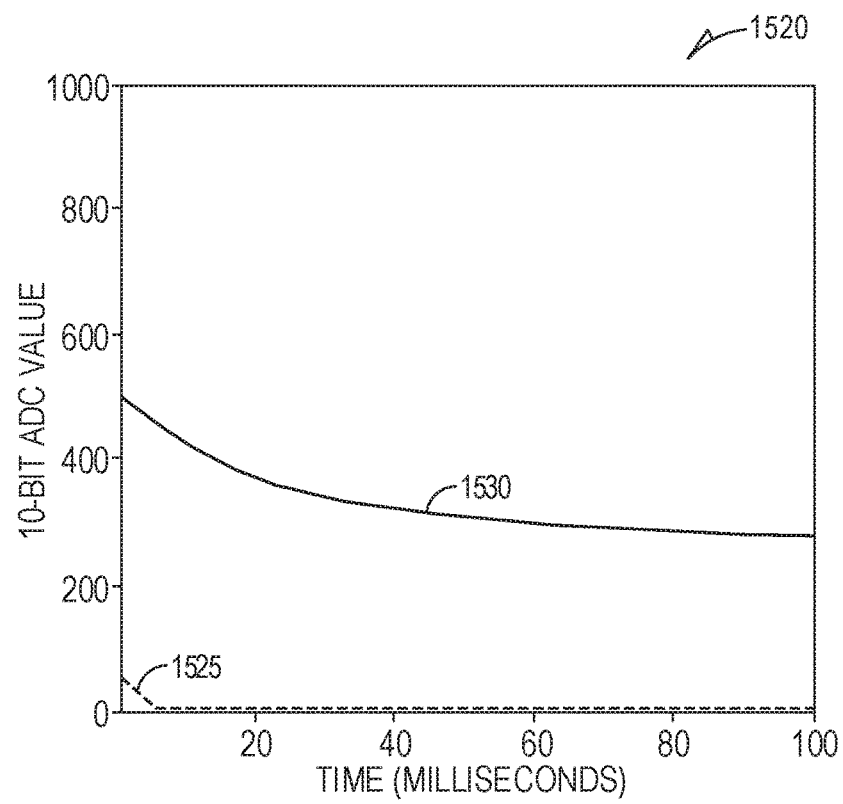

Noise. FIG. 15A is a graph 1500 illustrating soil temperature data of two sensor nodes 1505 and 1510. Data 1505 from node 9 exhibits the Noise fault. A graph 1520 in FIG. 15B shows the Fall-curves of the faulty sensor from node 9 and a non-faulty sensor from node 10 for comparison at 1525 and 1530 respectively. It can be seen that the Fall-curves are completely different for these two sensors. A loose connection on the ground pin of the soil temperature sensor from node 9, resulted in the noisy sensor data.

Figure 16A:
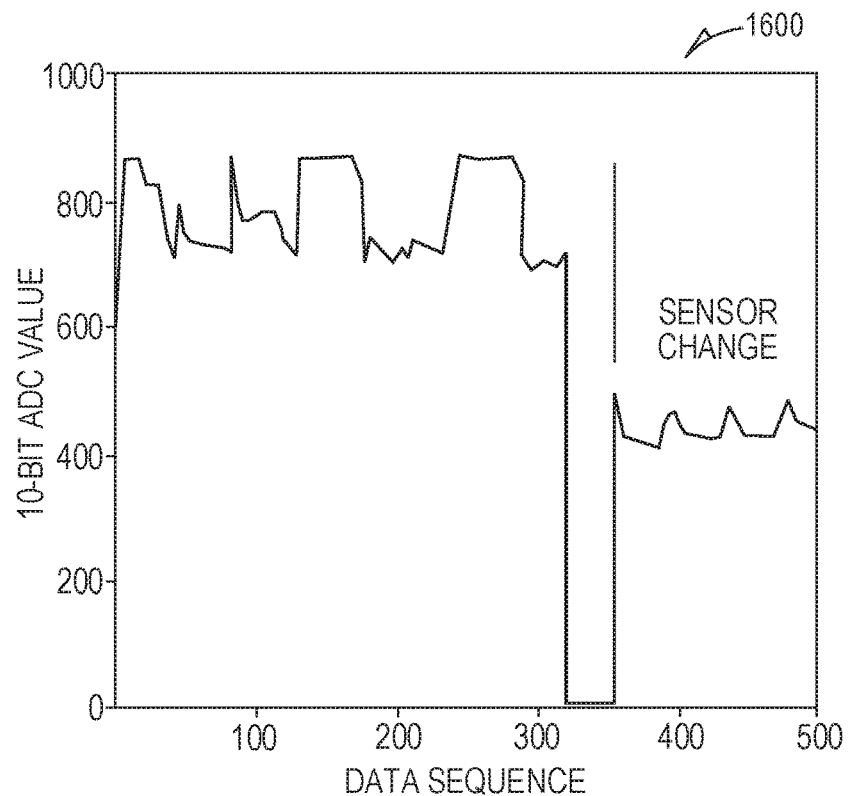
FIGS. 16A and 16B are graphs illustrating a noise fault and corresponding Fall-curve according to an example embodiment.
Figure 16B:
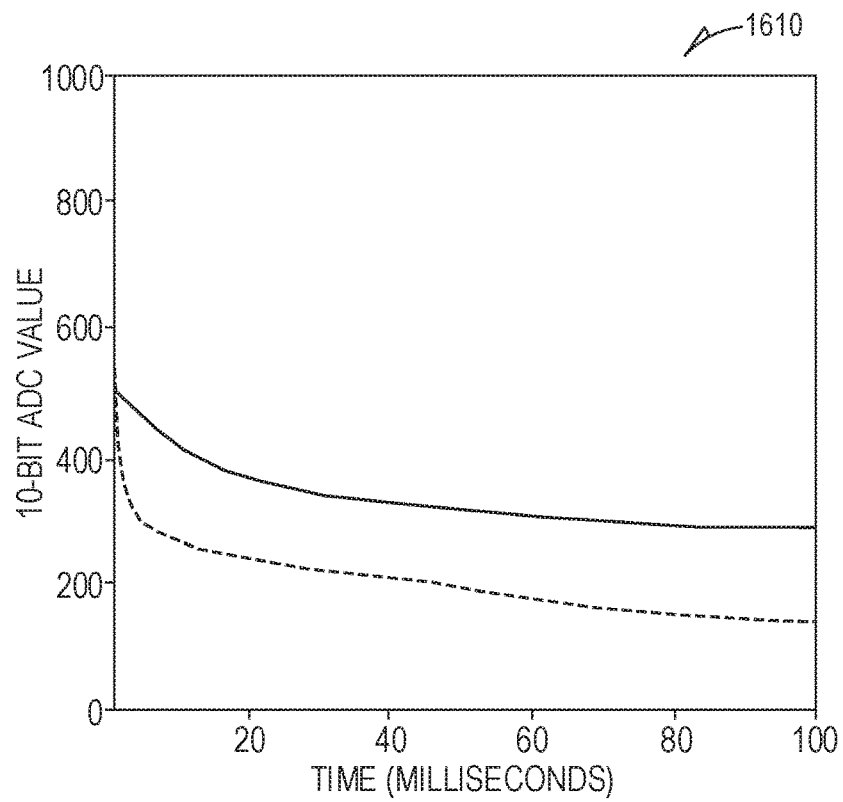

Sensor port mismatch. In one example, a soil moisture sensor had permanently gone bad due to a stuck-at fault. However, during replacement, the soil temperature sensor was mistakenly added on the port of soil moisture sensor by the field staff. Graph 1600 in FIG. 16A shows the sensor data, where data before sequence number 319 was from soil moisture sensor and data after 353 was from soil temperature sensor. The Fall-curve based technique automatically identified this mismatch by analyzing the Fall-curves as shown in a graph 1610 in FIG. 16B. It can be clearly seen that the Fall-curves before data sequence 319 and after 353 have two different signatures. Further, the system was able to match the Fall-curve to the soil temperature sensor and mark the data from this port as soil temperature by applying correct processing formula, rather than applying an incorrect processing formula.

Figure 17A:
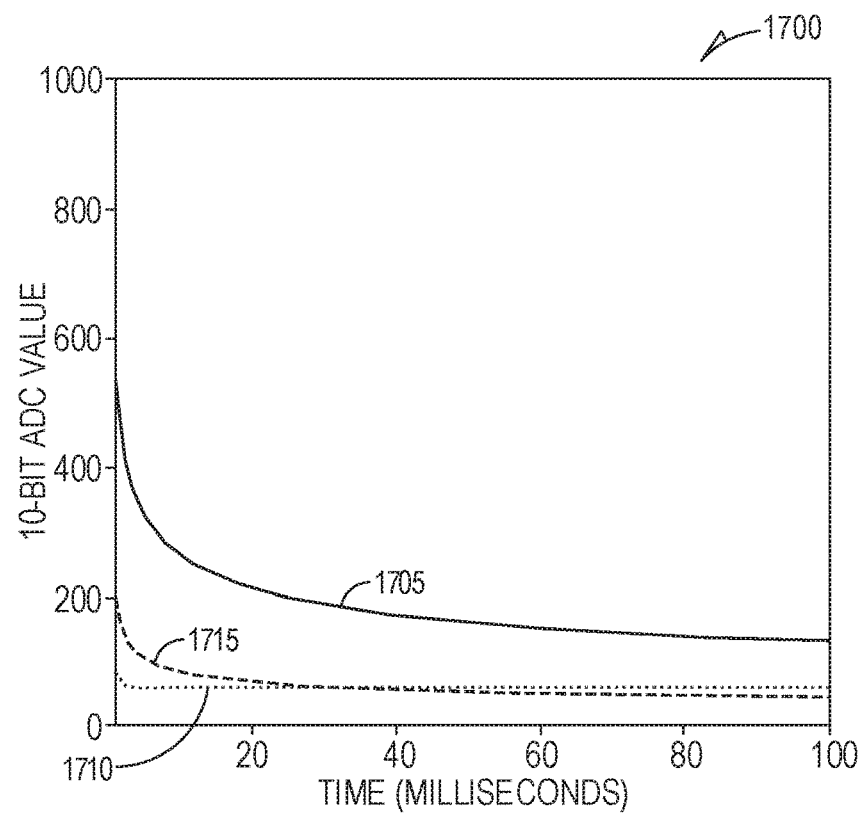
FIGS. 17A and 17B are graphs illustrating sensor port mismatch and corresponding Fall-curves according to an example embodiment.
Figure 17B:
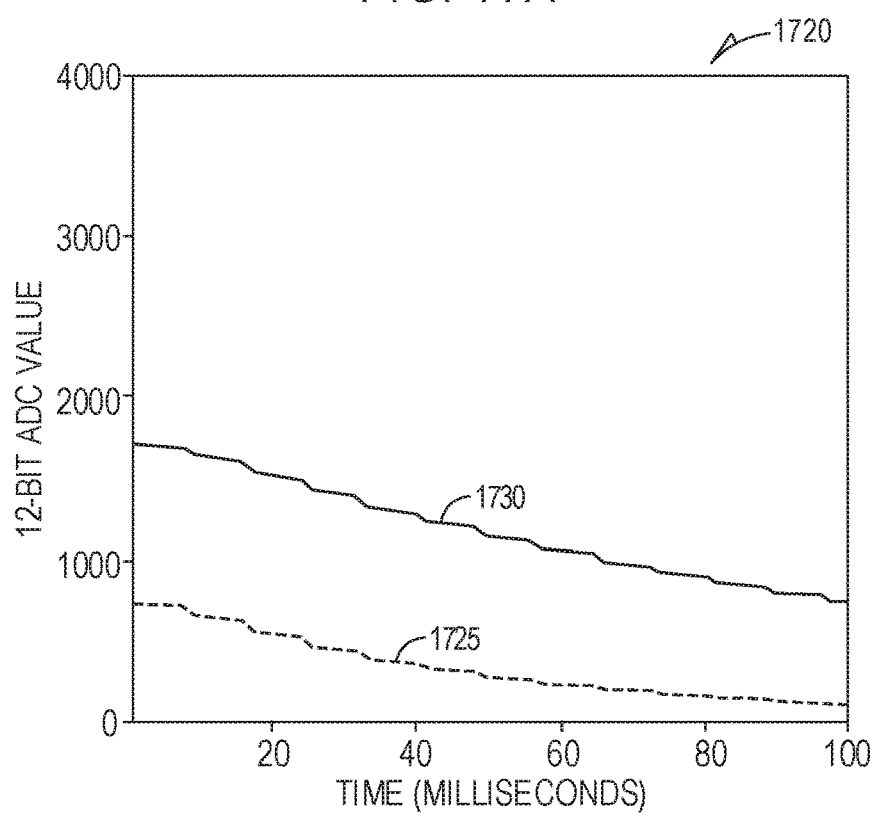

Beyond sensor data faults. One feature of the Fall-curve approach is to detect such faults that previously could not be diagnosed, such as faulty sensor data mimicking non-faulty sensor data and detection of unseen non-faulty data (novel data). Data-centric approaches fail to detect such faults. Graph 1700 of FIG. 17A illustrates how the use of Fall-curve based technique can detect such faults. Fall-curves 1705 and 1710 for nodes 10 and 15 look identical, whereas, node 19 has a distinguishable Fall-curve 1715, indicating a fault. Upon manual inspection, it may be found that node 19 has an open ADC wire connection. Graph 1720 in FIG. 17B presents the Fall-curves 1725 and 1730 respectively for both regular data points and spikes. Both Fall-curves show the similar pattern. Consequently, the system isolated spikes as novel data leveraging the Fall-curve. Thus, with the help of Fall-curve, the system can detect and isolate faults in an IoT deployment.

Some industrial-grade digital sensors, e.g., T6713 CO2 sensor, PMS7003 dust sensor, etc., have an internal microcontroller, which accumulates data from the analog sensing module of the sensor through the on-board ADC. The same ADC port may be used to accumulate the Fall-curve of the analog sensing module with minor firmware modification by the manufacturer. Further, low-cost digital sensors, e.g., ADXL34S accelerometer, Adafruit PIR sensor, etc., do not have an internal microcontroller. In such cases, accumulating Fall-curve may be done with hardware modifications.

If the raw values generated by a sensor are very low, then the resulting fall-time after turning off the sensor is negligible. This results in either a very small or no Fall-curve being accumulated. For example, a distance sensor is generating a low value as the object of interest is very close. In such cases, a higher sampling rate may be used to accumulate the Fall-curve data.

Figure 18:
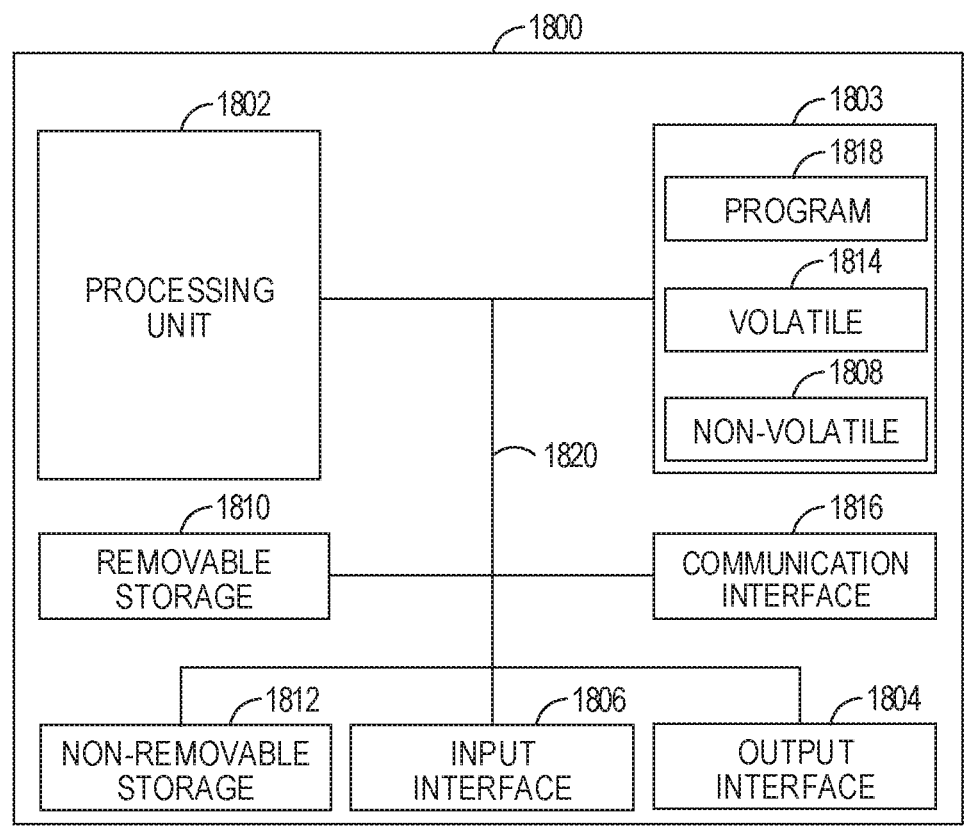
FIG. 18 is a block schematic diagram of a computer system to implement one or more example embodiments.

FIG. 18 is a block schematic diagram of a computer system 1800 to implement processing resources used in sensors, cloud-based resources, and other computing resources according to example embodiments. All components need not be used in various embodiments. One example computing device in the form of a computer 1800, may include a processing unit 1802, memory 1803, removable storage 1810, and non-removable storage 1812. Memory 1803 may include volatile memory 1814 and non-volatile memory 1808.

Computer 1800 may include or have access to a computing environment that includes—a variety of computer-readable media, such as volatile memory 1814 and non-volatile memory 1808, removable storage 1810 and non-removable storage 1812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1800 may include or have access to a computing environment that includes input 1806, output 1804, and a communication connection 1816. Output 1804 may include a display device, such as a touchscreen, that also may serve as an input device. A communication mechanism such as bus 1820 may allow all the elements to transfer data between themselves.

The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1802 of the computer 1800. A hard drive, CD-ROM, DRAM, and RAM are some examples of devices including a non-transitory computer-readable medium. The terms computer-readable medium and storage device do not include wireless signals, such as carrier waves or other communication or transmission media to the extent signals, carrier waves, or other media are deemed too transitory.

For example, a computer program 1818 may be used to cause processing unit 1802 to perform one or more methods or algorithms described herein. Computer program 1818 may be stored on a device or may be downloaded from a server to a device over a network such as the Internet.

EXAMPLES

1. A computer implemented method comprising turning off a sensor, receiving fall curve data from the sensor, and comparing the received fall curve data to a set of fall curve signatures to identify the sensor or a sensor fault.

2. The method of example 1 wherein the fall curve data corresponds to an analog signal output from the sensor in response to turning off the sensor.

3. The method of example 2 wherein the fall curve data comprises a time series sampling of the analog signal that is sampled periodically or in response to anomalous data received from the sensor prior to turning off the sensor.

4. The method of example 3 wherein the set of fall curve signatures include fall curve signatures from properly operating sensors that are different for different types of sensors and fall curve signatures from faulty sensors that are different for different types of faults.

5. The method of any of examples 1-4 wherein the fall curve data comprises a time series sampled analog output from the sensor in response to turning off the sensor and wherein comparing the received fall curve data comprises generating a feature vector for the time series sampled analog output and comparing the feature vector with feature vectors corresponding to the set of fall curve signatures to match the generated feature vector with one of the feature vectors of the set of fall curve signatures.

6. The method of example 5 wherein the feature vector is generated by fitting a polynomial curve to the time series sampled analog output, using polynomial coefficients of the polynomial curve as the feature vector, finding a nearest neighbor to the polynomial coefficients, and identifying the sensor or sensor fault in response to the nearest neighbor being within a certain threshold.

7. The method of example 6 wherein the hyper-parameters comprising fall curve width and polynomial degree are tuned to trade off accuracy based on resource and power constraints.

8. The method of any of examples 5-7 wherein the feature vectors corresponding to the set of fall curve signatures are generated by recording multiple fall curve signatures for multiple sensors and an ID for each of the multiple sensors, fitting polynomial curves to the recorded signatures, using polynomial coefficients of the polynomial curve as the feature vector, and performing clustering on the feature vectors for each sensor to identify a smaller set of unique features for each sensor.

9. The method of example 8 and further comprising optimizing a set of hyper-parameters comprising fall curve width, degree of polynomial, and number of clusters for the feature vectors.

10. The method of any of examples 1-9 wherein the sensor comprises a wireless sensor.

11. The method of any of examples 1-10 wherein the set of fall curve signatures comprises fall curve signatures from sensors having one or more of the faults comprising short fault, spike fault, stuck-at fault.

12. The method of any of examples 1-11 wherein comparing the received fall curve data to a set of fall curve signatures to identify the sensor or a sensor fault is performed via cloud-based computing resources or network edge based resources.

13. The method of any of examples 1-12 wherein comparing the received fall curve data to a set of fall curve signatures to identify the sensor or a sensor fault is performed by the sensor comprising a digital sensor.

14. A machine-readable storage device having instructions for execution by a processor of a machine to cause the processor to perform operations to perform a method of managing communication accounts, the operations comprising turning off a sensor, receiving fall curve data from the sensor, and comparing the received fall curve data to a set of fall curve signatures to identify the sensor or a sensor fault.

15. The device of example 14 wherein the set of fall curve signatures include fall curve signatures from properly operating sensors that are different for different types of sensors and fall curve signatures from faulty sensors that are different for different types of faults.

16. The device of any of examples 14-15 wherein the fall curve data comprises a time series sampled analog output from the sensor in response to turning off the sensor and wherein comparing the received fall curve data comprises generating a feature vector for the time series sampled analog output and comparing the feature vector with feature vectors corresponding to the set of fall curve signatures to match the generated feature vector with one of the feature vectors of the set of fall curve signatures.

17. The device of example 16 wherein the feature vector is generated by fitting a polynomial curve to the timer series sampled analog output, using polynomial coefficients of the polynomial curve as the feature vector, finding a nearest neighbor to the polynomial coefficients, and identifying the sensor or sensor fault in response to the nearest neighbor being within a certain threshold.

18. The device of example 17 wherein the feature vectors corresponding to the set of fall curve signatures are generated by recording multiple fall curve signatures for multiple sensors and an ID for each of the multiple sensors, fitting polynomial curves to the recorded signatures, using polynomial coefficients of the polynomial curve as the feature vector, and performing clustering on the feature vectors for each sensor to identify a smaller set of unique features for each sensor.

19. A device comprising a processor, an analog sensor coupled to the processor, and a memory device coupled to the processor and having a program stored thereon for execution by the processor to perform operations comprising turning off a sensor, receiving fall curve data from the sensor, and comparing the received fall curve data to a set of fall curve signatures to identify the sensor or a sensor fault.

20. The device of example 19 wherein the fall curve data comprises a time series sampled analog output from the sensor in response to turning off the sensor and wherein comparing the received fall curve data comprises generating a feature vector for the time series sampled analog output and comparing the feature vector with feature vectors corresponding to the set of fall curve signatures to match the generated feature vector with one of the feature vectors of the set of fall curve signatures.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   turning off a sensor;
   sampling a fall curve from the sensor in response to turning off the sensor via fall curve circuitry to generate fall curve data;
   comparing the fall curve data to a set of fall curve signatures; and
   identifying the sensor or a sensor fault as a function of the comparing.

2. The method of claim 1 wherein the fall curve data corresponds to an analog signal output from the sensor in response to turning off the sensor.

3. The method of claim 2 wherein the fall curve data comprises a time series sampling of the analog signal that is sampled periodically or in response to anomalous data received from the sensor prior to turning off the sensor.

4. The method of claim 3 wherein the set of fall curve signatures include fall curve signatures from properly operating sensors that are different for different types of sensors and fall curve signatures from faulty sensors that are different for different types of faults.

5. The method of claim 1 wherein the fall curve data comprises a time series sampled analog output from the sensor in response to turning off the sensor and wherein comparing the received fall curve data comprises:
   generating a feature vector for the time series sampled analog output; and
   comparing the feature vector with feature vectors corresponding to the set of fall curve signatures to match the generated feature vector with one of the feature vectors of the set of fall curve signatures.

6. The method of claim 5 wherein the feature vector is generated by:
   fitting a polynomial curve to the time series sampled analog output;
   using polynomial coefficients of the polynomial curve as the feature vector;
   finding a nearest neighbor to the polynomial coefficients; and
   identifying the sensor or sensor fault in response to the nearest neighbor being within a certain threshold.

7. The method of claim 6 wherein the hyper-parameters comprising fall curve width and polynomial degree are tuned to trade off accuracy based on resource and power constraints.

8. The method of claim 5 wherein the feature vectors corresponding to the set of fall curve signatures are generated by:
   recording multiple fall curve signatures for multiple sensors and an ID for each of the multiple sensors;
   fitting polynomial curves to the recorded signatures;
   using polynomial coefficients of the polynomial curve as the feature vector; and
   performing clustering on the feature vectors for each sensor to identify a smaller set of unique features for each sensor.

9. The method of claim 8 and further comprising optimizing a set of hyper-parameters comprising fall curve width, degree of polynomial, and number of clusters for the feature vectors.

10. The method of claim 1 wherein the sensor comprises a wireless sensor.

11. The method of claim 1 wherein the set of fall curve signatures comprises fall curve signatures from sensors having one or more of the faults comprising short fault, spike fault or stuck-at fault.

12. The method of claim 1 wherein comparing the received fall curve data to a set of fall curve signatures to identify the sensor or a sensor fault is performed via cloud-based computing resources or network edge based resources.

13. The method of claim 1 wherein comparing the received fall curve data to a set of fall curve signatures to identify the sensor or a sensor fault is performed by the sensor comprising a digital sensor.

14. A computer-readable storage device having instructions for execution by a processor of a machine to cause the processor to perform operations to perform a method of managing communication accounts, the operations comprising:
   turning off a sensor;
   sampling a fall curve from the sensor in response to turning off the sensor via fall curve circuitry to generate fall curve data;
   comparing the fall curve data to a set of fall curve signatures; and
   identifying the sensor or a sensor fault as a function of the comparing.

15. The device of claim 14 wherein the set of fall curve signatures include fall curve signatures from properly operating sensors that are different for different types of sensors and fall curve signatures from faulty sensors that are different for different types of faults.

16. The device of claim 14 wherein the fall curve data comprises a time series sampled analog output from the sensor in response to turning off the sensor and wherein comparing the received fall curve data comprises:
   generating a feature vector for the time series sampled analog output; and
   comparing the feature vector with feature vectors corresponding to the set of fall curve signatures to match the generated feature vector with one of the feature vectors of the set of fall curve signatures.

17. The device of claim 16 wherein the feature vector is generated by:
   fitting a polynomial curve to the timer series sampled analog output;
   using polynomial coefficients of the polynomial curve as the feature vector;
   finding a nearest neighbor to the polynomial coefficients; and
   identifying the sensor or sensor fault in response to the nearest neighbor being within a certain threshold.

18. The device of claim 17 wherein the feature vectors corresponding to the set of fall curve signatures are generated by:
   recording multiple fall curve signatures for multiple sensors and an ID for each of the multiple sensors;
   fitting polynomial curves to the recorded signatures;
   using polynomial coefficients of the polynomial curve as the feature vector; and
   performing clustering on the feature vectors for each sensor to identify a smaller set of unique features for each sensor.

19. A device comprising:
   a processor;
   an analog sensor coupled to the processor; and
   a memory device coupled to the processor and having a program stored thereon for execution by the processor to perform operations comprising:
   turning off a sensor;
   sampling a fall curve from the sensor in response to turning off the sensor via fall curve circuitry to generate fall curve data;
   comparing the fall curve data to a set of fall curve signatures; and
   identifying the sensor or a sensor fault as a function of the comparing.

20. The device of claim 19 wherein the fall curve data comprises a time series sampled analog output from the sensor in response to turning off the sensor and wherein comparing the received fall curve data comprises:
   generating a feature vector for the time series sampled analog output; and
   comparing the feature vector with feature vectors corresponding to the set of fall curve signatures to match the generated feature vector with one of the feature vectors of the set of fall curve signatures.

* * * * *